US011669411B2

(12) United States Patent
Ravipati et al.

(10) Patent No.: US 11,669,411 B2
(45) Date of Patent: Jun. 6, 2023

(54) EFFICIENT PLUGGABLE DATABASE RECOVERY WITH REDO FILTERING IN A CONSOLIDATED DATABASE

(71) Applicant: Oracle International Corporation, Redwood Shores, CA (US)

(72) Inventors: Giridhar Ravipati, Foster City, CA (US); Yunrui Li, Los Altos, CA (US); Kumar Rajamani, San Ramon, CA (US); Muthu Olagappan, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 165 days.

(21) Appl. No.: 17/113,091

(22) Filed: Dec. 6, 2020

(65) Prior Publication Data

US 2022/0179753 A1    Jun. 9, 2022

(51) Int. Cl.
*G06F 12/00* (2006.01)
*G06F 11/14* (2006.01)

(52) U.S. Cl.
CPC ...... *G06F 11/1469* (2013.01); *G06F 11/1464* (2013.01); *G06F 11/1471* (2013.01); *G06F 2201/80* (2013.01)

(58) Field of Classification Search
CPC ............. G06F 11/1469; G06F 11/1464; G06F 11/1471; G06F 2201/80
See application file for complete search history.

(56) References Cited

U.S. PATENT DOCUMENTS

| | | |
|---|---|---|
| 2001/0048752 A1 | 12/2001 | Miki et al. |
| 2003/0236768 A1 | 12/2003 | Sribhibhadh et al. |
| 2004/0181434 A1 | 9/2004 | Kondo |
| 2004/0205541 A1 | 10/2004 | D'amico |
| 2004/0249796 A1 | 12/2004 | Azzam |
| 2005/0216474 A1 | 9/2005 | Wiener |
| 2005/0235251 A1 | 10/2005 | Arend et al. |
| 2005/0278351 A1 | 12/2005 | Niyogi et al. |
| 2006/0041827 A1 | 2/2006 | Yamaoka et al. |
| 2006/0149774 A1 | 7/2006 | Egnor |
| 2007/0067291 A1 | 3/2007 | Kolo et al. |
| 2007/0083573 A1 | 4/2007 | Gillespie |

(Continued)

*Primary Examiner* — Shawn X Gu
(74) *Attorney, Agent, or Firm* — Vista IP Law Group, LLP

(57) ABSTRACT

A computer program product, system, and computer implemented method for management of a consolidated database and implementing pluggable database recovery with redo filtering in a consolidated database according to some embodiments. Generally, the process includes ongoing activities that maintain activity logs and summarize the activity for respective activity logs (e.g., in an activity vector maintained in a consolidated database catalog). In some embodiments, event-based activities corresponding to recovery processes are triggered by an administrator or an automated process, completed and then do not occur again until another triggering event. The event-based activities can leverage the summary information to quickly determine which online activity logs are relevant to the type of recovery operation for a particular pluggable database. In this way the approach provided herein enables recovery without requiring that all log activity be analyzed to determine whether it is relevant to a particular pluggable database.

26 Claims, 18 Drawing Sheets

(56) References Cited

U.S. PATENT DOCUMENTS

| | | |
|---|---|---|
| 2007/0198569 A1 | 8/2007 | Johnston |
| 2007/0226192 A1 | 9/2007 | Vaca et al. |
| 2007/0269140 A1 | 11/2007 | Nagasaka |
| 2008/0010257 A1 | 1/2008 | Tolfa et al. |
| 2008/0077560 A1 | 3/2008 | Comi et al. |
| 2008/0077578 A1 | 3/2008 | Ozveren et al. |
| 2008/0082531 A1 | 4/2008 | Suarez |
| 2008/0154894 A1 | 6/2008 | Chen et al. |
| 2008/0162455 A1 | 7/2008 | Daga et al. |
| 2008/0215629 A1 | 9/2008 | Parker Dirac et al. |
| 2008/0301146 A1 | 12/2008 | Vitanov |
| 2008/0313215 A1 | 12/2008 | Beker et al. |
| 2009/0112930 A1 | 4/2009 | Anguiano |
| 2009/0187543 A1 | 7/2009 | Samborn |
| 2009/0222325 A1 | 9/2009 | Anderson et al. |
| 2009/0271434 A1 | 10/2009 | George |
| 2009/0299785 A1 | 12/2009 | Savjani et al. |
| 2009/0319549 A1 | 12/2009 | Millett |
| 2009/0319899 A1 | 12/2009 | Moon et al. |
| 2010/0076800 A1 | 3/2010 | Ayudhan |
| 2010/0082617 A1 | 4/2010 | Liu et al. |
| 2014/0095452 A1* | 4/2014 | Lee .................... G06F 16/9535 707/683 |
| 2014/0095530 A1 | 4/2014 | Lee et al. |
| 2015/0120673 A1* | 4/2015 | Rolfe .................. G06F 11/1458 707/674 |
| 2017/0116207 A1 | 4/2017 | Lee et al. |
| 2017/0116249 A1 | 4/2017 | Ravipati et al. |

* cited by examiner

EFFICIENT PLUGGABLE DATABASE RECOVERY WITH REDO FILTERING IN A CONSOLIDATED DATABASE

BACKGROUND

Modern computing systems handle large amounts of data. For single user/device data storage systems this often corresponds to gigabytes and even terabytes of data. However, in the content of network environments where multiple users or services are provided the amount of data to be managed is often in the order of petabytes of data, or more, some of which may be shared by multiple users or used to provide services to multiple users. Unfortunately, the systems designed for individual users simply are not capable of efficiently handling the amount of data in these network environments.

One current approach to address the needs of network system is to use pluggable databases such as in a consolidated database. This solves the problem of data management to a certain extent by allowing different pluggable databases to be open as needed in a consolidated database instance and even allows multiple users/services to operate on that data concurrently by allowing the same pluggable database to be open in multiple consolidated database instances at the same time. However, this also presents another challenge in the area of data resilience and restoration.

In particular, because any pluggable database can be open on any consolidated database instance, recovery data for each consolidated database instance needs to be analyzed in most recovery scenarios to capture the state of that pluggable database for use in recovery/cloning operations. Unfortunately, the processing of each set of recovery data for each consolidated database is resource intensive.

Therefore, there is a need for an improved approach to manage recovery data to decrease the amount of processing required in recovery/cloning activities.

SUMMARY

Embodiments of the present disclosure provide a method, apparatus, and product for efficient pluggable database recovery with redo filtering in a consolidated database.

The approach disclosed herein generally comprises management of a consolidated database and implementing pluggable database recovery with efficient redo filtering in a consolidated database according to some embodiments. Generally, the process includes two types of activities, ongoing activities and activities that are event based. The ongoing activities maintain the activity logs and summarize the activity for respective logs (e.g., in an activity vector maintained in a consolidated database catalog). The event-based activities correspond to recovery processes that are triggered by an administrator or an automated process, completed and then do not occur again until another triggering event. The event-based activities can leverage the summary information to quickly determine which online activity logs are relevant to the type of recovery operation for a particular pluggable database. In this way the approach provided herein enables recovery without requiring that all log activity be analyzed to determine whether it is relevant to a particular pluggable database.

Further details of aspects, objects and advantages of the disclosure are described below in the detailed description, drawings, and claims. Both the foregoing general description and the following detailed description are exemplary and explanatory and are not intended to be limiting as to the scope of the disclosure.

BRIEF DESCRIPTION OF THE DRAWINGS

The drawings illustrate the design and utility of embodiments of the present disclosure, in which similar elements are referred to by common reference numerals. In order to better appreciate the advantages and objects of embodiments of the disclosure, reference should be made to the accompanying drawings. However, the drawings depict only certain embodiments of the disclosure, and should not be taken as limiting the scope of the disclosure. The drawings use like reference numerals to identify like elements, and unless otherwise specified, any description for that element may be applicable to each use of that reference numeral were appropriate.

DETAILED DESCRIPTION OF THE EMBODIMENTS OF THE DISCLOSURE

Various embodiments are described hereinafter with reference to the figures. It should be noted that the figures are not necessarily drawn to scale. It should also be noted that the figures are only intended to facilitate the description of the embodiment(s) and are not intended as an exhaustive description of the disclosure or as a limitation on the scope of the disclosure. In addition, an illustrated embodiment need not have all the aspects or advantages shown. An aspect or an advantage described in conjunction with a particular embodiment is not necessarily limited to that embodiment and can be practiced in any other embodiments even if not so illustrated.

Figure 1:
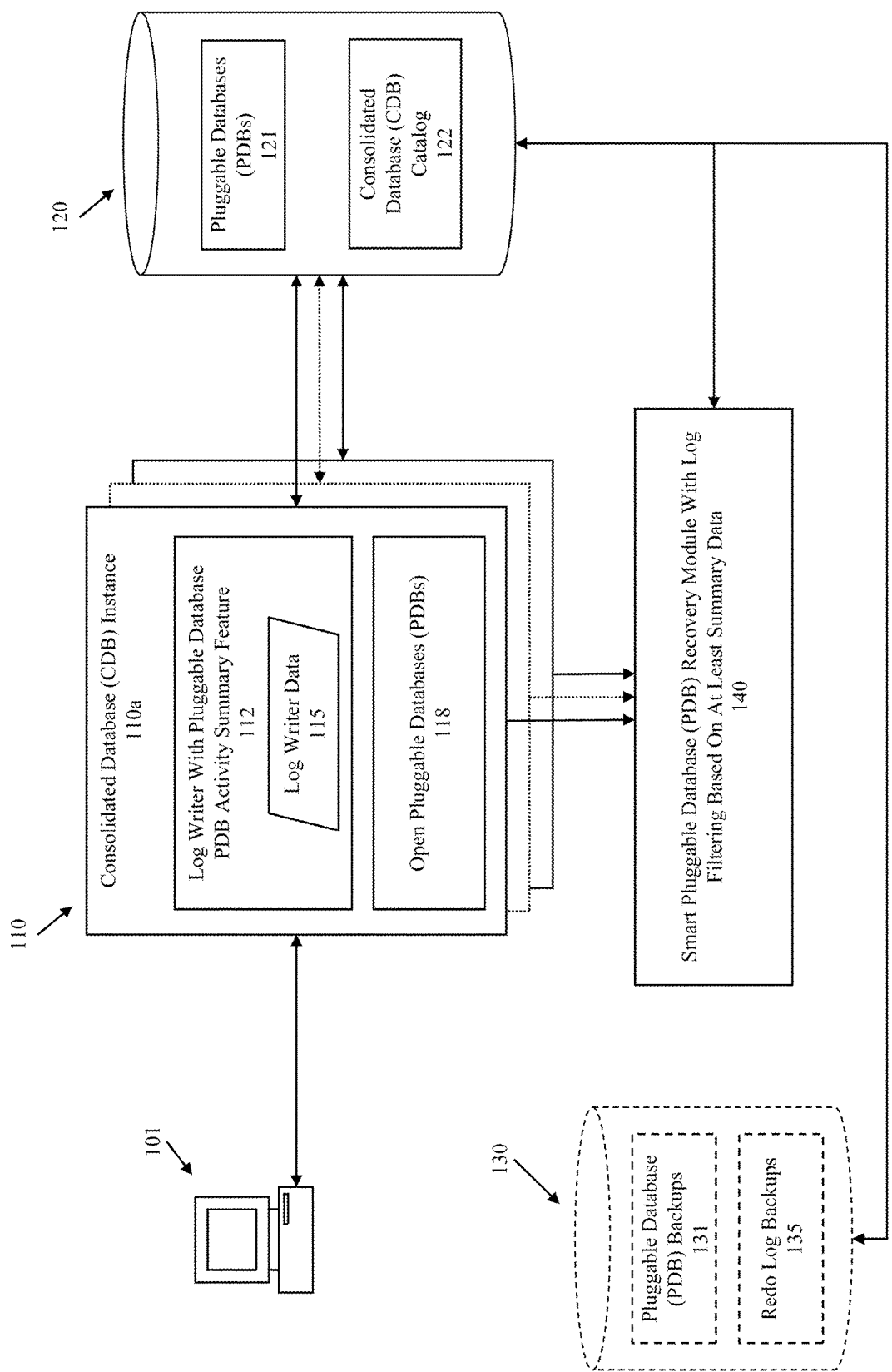
FIG. 1 illustrates a system in which some embodiments of the disclosure are implemented.

FIG. 1 illustrates a system in which some embodiments of the disclosure are implemented. Generally, the system includes one or more consolidated database instances that have one or more pluggable databases that are open in the consolidated database instance, where a log writer element includes a pluggable database activity summary feature that generates summary information usable by a smart pluggable database recovery element to identify log data that is not relevant to a particular recovery task (or only the logs with data relevant to the particular recovery task).

The system includes a computer device 101, databases 120 and optionally 130, one or more consolidated database instances 110, and a smart pluggable database recovery module with log filtering based on at least summary data (see 140).

The computing device 101 interacts with the consolidated database (CDB) instance(s) 110a to access data within a respective CDB instance such as an open pluggable database (PDB). In some embodiments, multiple computing devices 101 can interact with one or more respective CDB instances. Furthermore, the computing devices might comprise a user, another service, an administrator, or any other computing device that allows data access or management of a CDB or an element therein. Generally, a computing device can interact with the CDB to read data from a PDB (e.g., from open pluggable databases 118) or write data to a PDB. In the event of a read operation, such access might be logged for tracking/security/audit purposes. However, in the event that an access corresponds to writing data (e.g., by created a new entry/file/object/block or updating an existing entry/file/object/block) a log writer with a PDB activity summary feature 112 is used to both write redo information into a log (e.g., log writer data 115) and to update summary activity data when a PDB not previously written to during a given time period is the target of a written operation (e.g., after a commit). Thus, the CDB with the log writer 112 maintains data 115 that can easily be referenced to quickly determine whether there was any modification to a particular PDB during that time period. In some embodiments, multiple logs can be maintained and archived which may include rolling the multiple logs into a single log(s). Furthermore, any CDB instance can contain multiple PDBs and each CDB instance may have one or more open PDB at any given time where the PDBs that are open may or may not overlap with PDBs open in another CDB instance. A PDB itself is essentially a set of metadata and data where the metadata describes a schema, schema objects, and nonschema objects that can be presented on a network as a separate database. In some embodiments, one or more of the consolidated database instances 110 comprises a container database or collection of containers. In some embodiments, one or more of the PDBs comprise containers (e.g. partitions or virtual disk), may be defined by a class, data structure or an abstract data type. In some embodiments, the PDBs may comprise a container equivalent.

The computing device 101 comprises any type of computing device that may be used to operate or interface with the CDB, whether directly or indirectly. Examples of such user computing devices 101 include workstations, personal computers, laptop computers, or remote computing terminals. User computing devices 101 may also comprise any type of portable tablet device, including for example, tablet computers, and portable readers. User computing device 101 may also include mobile telephone devices relating to any mobile device that can suitably access any computing systems on the Internet such as smartphones and programmable mobile handsets. It is noted that the disclosure is not limited in its application to just these types of devices. The embodiments of the disclosure are applicable to any computing device that works in conjunction with access to digital information stored on, as an example, the Internet. One of ordinary skill in the art may appreciate embodiments of this present disclosure may be implemented on the Internet, on a closed network, on a hybrid open and closed network, or on a cloud network.

The database 120 includes the pluggable databases (PDBs) 121 and a consolidated database (CDB) catalog 122. The consolidated database catalog includes information that identifies each CDB instance and in some embodiments, the log writer summary data and/or the redo records themselves. Details of the catalog data will be discussed further below. However, briefly the catalog data allows for at least the identification of CDB metadata for use in recovery processes.

In some embodiments, another database is included, database 130, which is similar to database 120. However, whereas database 120 is the current active database, database 130 is a backup database, such as one created using a recovery manager (e.g., RMAN) process which may include the same data or different data as illustrated here. In particular, database 120 includes the current pluggable databases (PDBs) representing committed transactions, whereas database 130 includes pluggable database (PDB) backups 131 which likely represents a previous state of the PDBs. Additionally, as illustrated here, database 130 includes redo log backups 135 which may include one or both of the logs generated by the log writer 112 and summary information generated by the same. In some embodiments, the redo log backups 135 also include consolidated database catalog backups.

The smart pluggable database (PDB) recovery module includes log filtering that is based on at least the summary data generated by the log writer 112. Generally, the log writer generates logs that correspond to a range of transactions. In some embodiments, the range of transactions are identified using an SCN (system change number) which is modified (e.g., incremented) whenever a transaction is committed with respective transactions being associated with a then current SCN. Each log is also associated with summary information that can be consulted to determine which PDBs where active (or at least modified) within a range of transactions for a given log. Thus, the smart PDB recovery module can leverage the summary information to determine which logs need to be processed to perform the indicated PDB recovery operations and can exclude from traversal the logs where the summary information does not indicate that the PDB being restored was modified over an SCN range that corresponds to said log. Not only does this help improve recovery times where a single CDB instance was active during the relevant period, but the improvement is multiplied when multiple CDB instances where active during the relevant time period. This is due at least in part to the inherent separation between CDB instances which are associated with the separate generation of logs for each CDB that would each need to be processed when performing a recovery operation for a given PDB.

Figure 2:
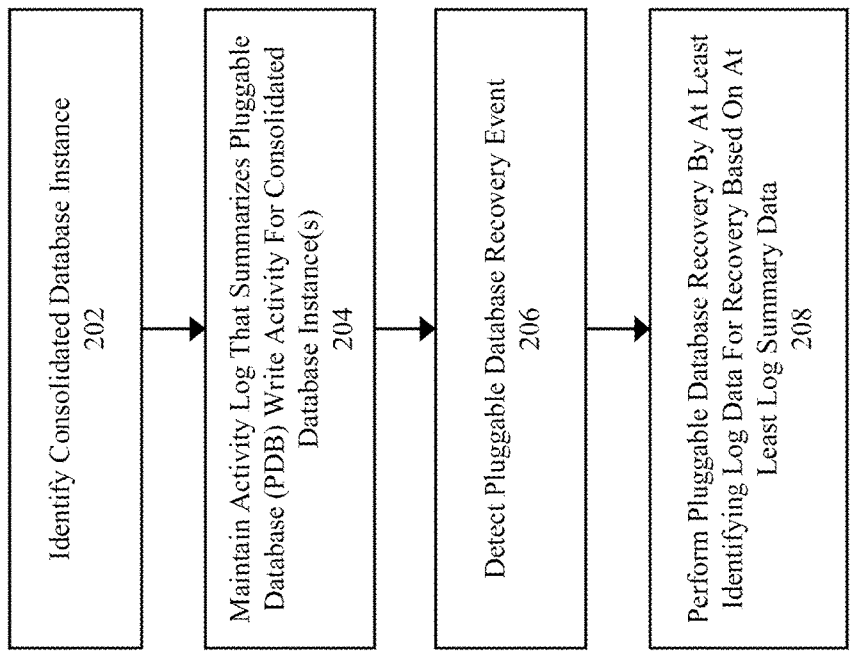
FIG. 2 is a flowchart for management of a consolidated database and implementing pluggable database recovery with efficient redo filtering in a consolidated database according to some embodiments.

FIG. 2 is a flowchart for management of a consolidated database and implementing pluggable database recovery with efficient redo filtering in a consolidated database according to some embodiments. Generally, the process includes two types of activities, ongoing activities and activities that are event based. The ongoing activities maintain the activity logs and summarize the activity for respective logs. The event-based activities correspond to recovery processes that are triggered by an administrator or an automated process, which are completed and then do not occur again until another triggering event.

The process starts, at 202, where a consolidated database instance is identified. For example, an administrator might configure a consolidated database (CDB) instance for a particular purpose at a given networking environment. Alternatively, and/or additionally, a CDB instance might be configured based on a determination from an automated process. For example, a process limit might be reached for a given CDB instance where the demand for processing currently outstrips what the CDB instance processes are capable of providing. A second CDB instance could then be created to handle the excess demand. In some embodiments, another CDB instance might be created for a different purpose. For example, a first CDB instance might be created for file sharing, second for email, a third for CRM services, and so on. Each CDB instance might then be associated with overlapping or non-overlapping data or a combination thereof (e.g., the CRM service and the file sharing processes might both present the same PDB for access by users).

At 204, activity log information is capture and maintained on an ongoing basis. This information includes not only the logs previously discussed having redo information for committed transactions, but also summary information that specifies which pluggable database(s) were modified during respective periods. This will be discussed in further in association with at least FIGS. 3A-5D.

At 206, a pluggable database recovery event is detected. Here the recovery event could be detected automatically based on health monitoring information for a PDB or could be triggered by an administrator. Furthermore, the detection of a recovery event could be detected in any way already known in the art.

At 208, pluggable database recovery is performed by at least identifying log data for recovery based on at least the log summary data. For example, the summary data might identify which logs include redo records that correspond to a PDB that is being recovered. This also logically or directly identifies which logs do not include such redo records. Thus, the summary data allows for logs that are irrelevant to the current recovery operation to be ignored. The recovery process will be discussed further below in regard to at least FIGS. 6-7C.

Figure 3A:
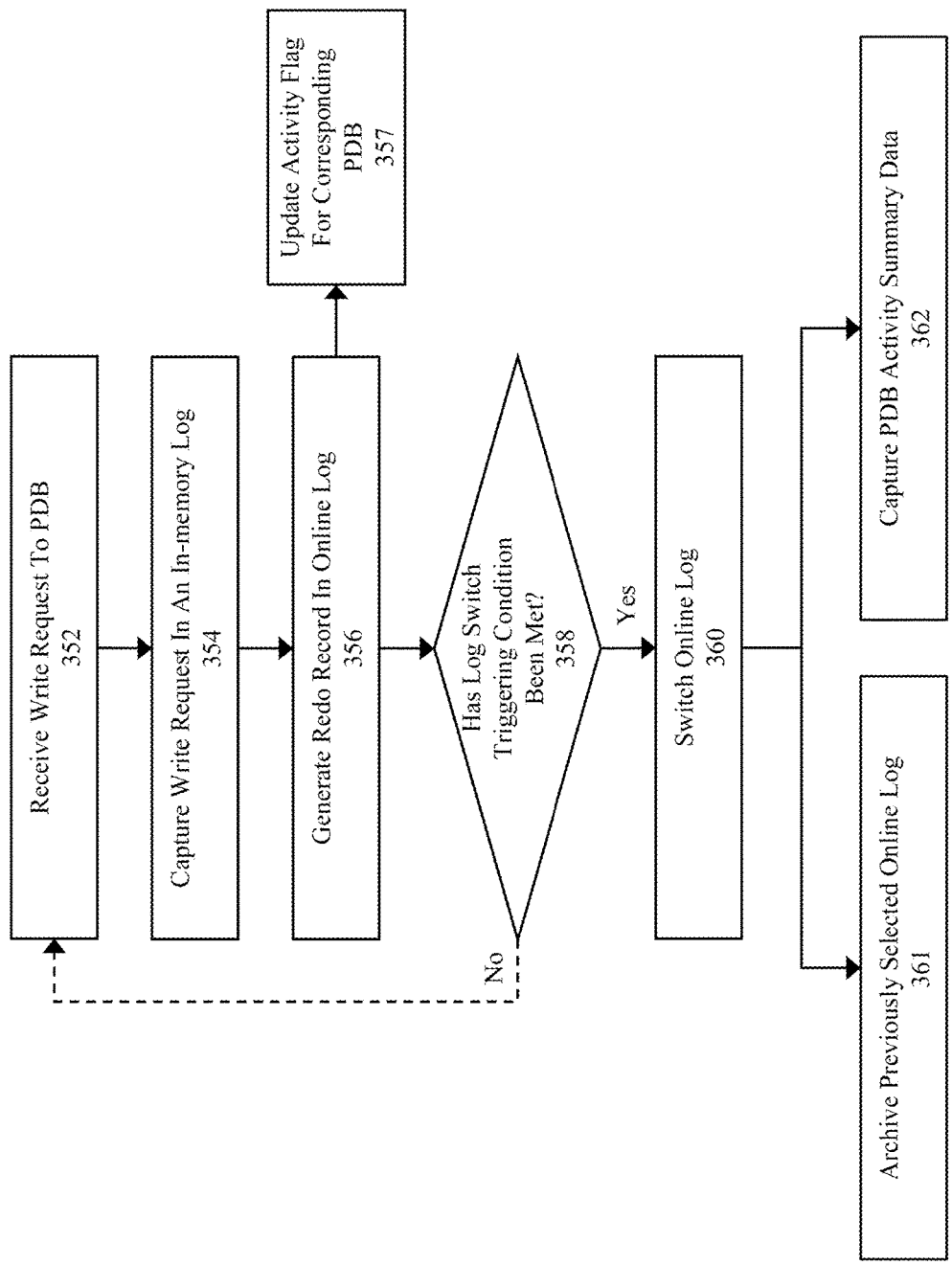
FIG. 3A is a more detailed flowchart for maintaining an activity log that summarizes pluggable database (PDB) write activity for consolidated database instance(s) according to some embodiments.

FIG. 3A is a more detailed flowchart for maintaining an activity log that summarizes pluggable database (PDB) write activity for consolidated database instance(s) according to some embodiments. Generally, the process operates by identifying writes to a PDB, determining if that PDB was already written to in a given online log, updated an activity flag when that the PDB was not already written to and managing log switching and archiving operations. Additionally, each CDB instance will implement this process. Thus, multiple different sets of online logs and archive logs may exist as well as summary data. In some embodiments, the summary data is combined into one or more catalogs or dictionaries for reference by the recovery process. In some embodiments, the steps described herein can be implemented in a different order from that illustrated herein.

The process starts at 352 when a write request to a PDB is received. Initially, this write request is captured in an in-memory log at 354. Subsequently, that write request is committed and a redo record is generated and stored in a current online activity log at 356. Additionally, whenever a new redo record is captured, an activity flag for the relevant PDB is updated at 357. In some embodiments, each time a redo record is captured the flag is set to indicate activity. For example, when a new online activity log is started all entries are set to no activity (e.g., boolean bit flags that maps to each respective PDBs are set to zero). Subsequently, when a redo record is captured the corresponding entry is set to indicate activity (e.g., the boolean bit flag for the corresponding PDB is set to one). In some embodiments, a determination is first made as to whether the corresponding value was already set to indicate the activity. However, in most circumstances simply setting the flag to indicate activity is more efficient and less resources intensive.

At 358, a determination is made as to whether a log switch triggering condition has been met. For example, the trigger condition might be met when any one or more of the following conditions are true for the online activity log: the online activity log is full, the online activity log is old, the online activity log has reached its max SCN, or the online activity log is manually flushed. If the log triggering condition has not be met, then the process returns to 352 to receive or wait for receipt of a new write request. However, if the log switch triggering condition has been met then the process will trigger log switching at 360.

At 360 the current online log is closed, and a replacement online log is selected. Generally, the replacement online log is selected from a set of available online logs and the summary information is initialized to indicate that no PDBs are currently active. Thus, the online log process for each CDB instance needs to have two logs. One to be the current log, and one to replace the current log when log switching is triggered. Additionally, once the log is closed and the replacement log is selected, the previously selected log is archived at 361. In some embodiments, the previously selected might be combine with other logs already existing in the archive. However, generally, keeping the archived versions of the online logs is more desirable because this allows of the summary information to provide more granular identification of the relevant logs. None the less, this also can be balanced with the size of the logs in the archive by combining multiple online logs into consolidated archived sets of online logs. However, in such cases the summary information would also be combined for all the logs that are consolidated in the set.

At 362, the PDB activity summary data is captured. For instance, the summary data might be captured within the CDB instance, within a CDB catalog associated with the instance, and/or at a database 130 using a remote backup manager.

Figure 3B:
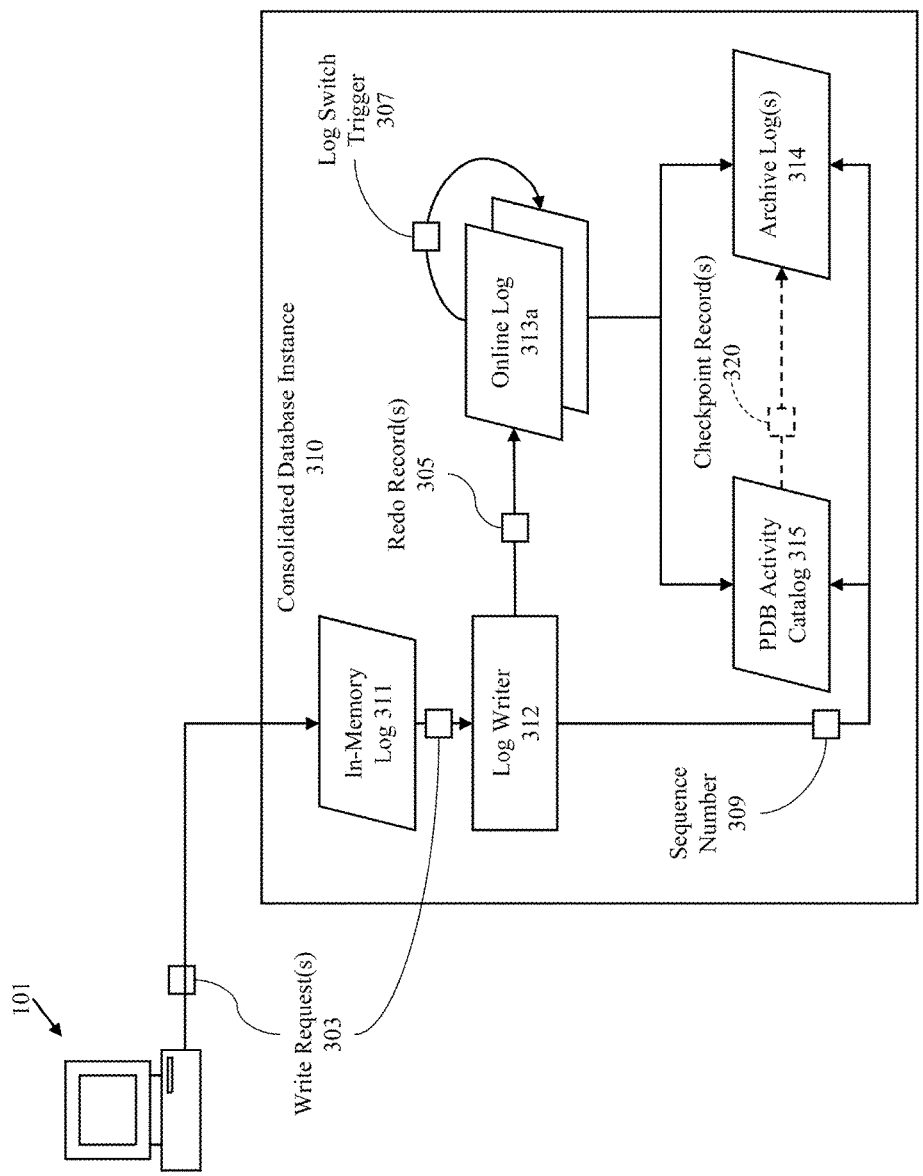
FIG. 3B illustrates a system for maintaining an activity log that summarizes pluggable database (PDB) write activity for consolidated database instance(s) according to some embodiments.

FIG. 3B illustrates a system for maintaining an activity log that summarizes pluggable database (PDB) write activity for consolidated database instance(s) according to some embodiments. The figure illustrates a single CDB instance interaction with a single user to generate the relevant data. However, as one would understand from the disclosure provided in this document, each CDB instance could have the same processes/elements and multiple users could interact with each CDB instance. This figure will be discussed briefly in the context of an example flow of operation of the system illustrated in this figure (See FIGS. 4A-4D below). Where the identifiers in this figure are used that match earlier identifiers the description for the corresponding identifiers also apply to the elements identified here.

The consolidated database instance 310, as illustrated, includes an in-memory log 311 for holding write request(s) received from a user device (see user device 101 and write requests 303). These write requests might be committed. The commit triggers the redo record(s) 305 to be generated and provided to the current online log 313*a* which might be switched with another online log when a triggering condition is met at 307. In some embodiments, the online logs are provided in a shared memory structure, such that multiple processes (e.g., threads) can write to the online log. In this way a single CDB instance can be managed by multiple processes and even multiple computing devices. Eventually, the online log switch will be triggered, and the contents of the online log will be archive at 314. Additionally, summary information is captured in the PDB activity catalog and in some circumstances, a sequence number 309 is provided by the log writer 312.

In some embodiments a checkpoint record 320 is generated. In some embodiments the checkpoint record identifies summary information over a period greater than that of a single online log. For instance, a checkpoint record could be generated for a number of archived online logs (e.g., every 8 online logs). In some embodiments, a check point record also requires that the online logs be flushed to the archive before generation.

FIGS. 4A-4D illustrate an example flow for maintaining an activity log that summarizes pluggable database (PDB) write activity for consolidated database instance(s) according to some embodiments. The flow illustrates operation of the approach provided herein in relation to the system illustrated in FIG. 3B.

Figure 4A:
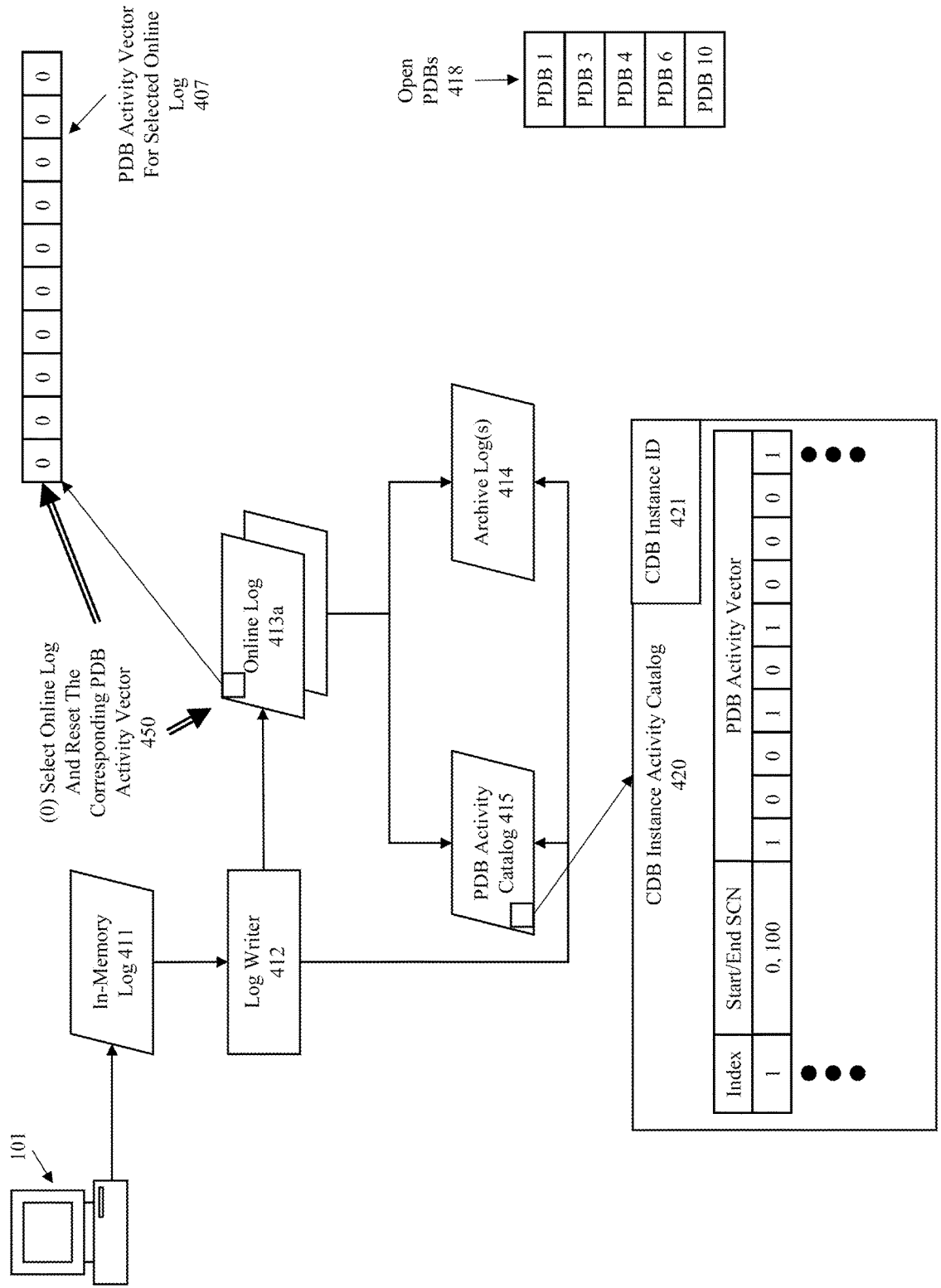
FIGS. 4A-4D illustrate an example flow maintaining an activity log that summarizes pluggable database (PDB) write activity for consolidated database instance(s) according to some embodiments.

FIG. 4A illustrates an initial state of the system after a new online log has been selected but before any redo records have been generated for that new online log. As illustrated herein 411, 412, 413*a*, 414, 415 corresponds to 311, 312, 313*a*, 314, and 315 respectively.

As illustrated, at 450, the new online log is selected and a corresponding PDB activity vector 450 (e.g., bit vector where individual bits map to respective PDBs in a network environment) is reset to zero to indicate that no activity has been captured (see PDB activity vector for selected online log 407). Additionally, the open PDBs 418 are currently PDB 1, 3, 4, 6, and 10. For the purpose of this illustration we presume that the number of PDBs within the system is 10 which is the same as the number of bits in the PDB activity vector 407, but which in this instance is not the same as the number of open PDBs.

Additionally, the PDB activity catalog 415 includes CDB instance activity catalog 420 which is associated with an instance ID at 421 and includes some number of entries. For the sake of simplicity, only one entry is illustrated which is at index 1 and has a start/end SCN range of 0-100 and a PDB activity vector that indicates that PDBs 1, 4, 6, and 10 where active during the SCN range.

Figure 4B:
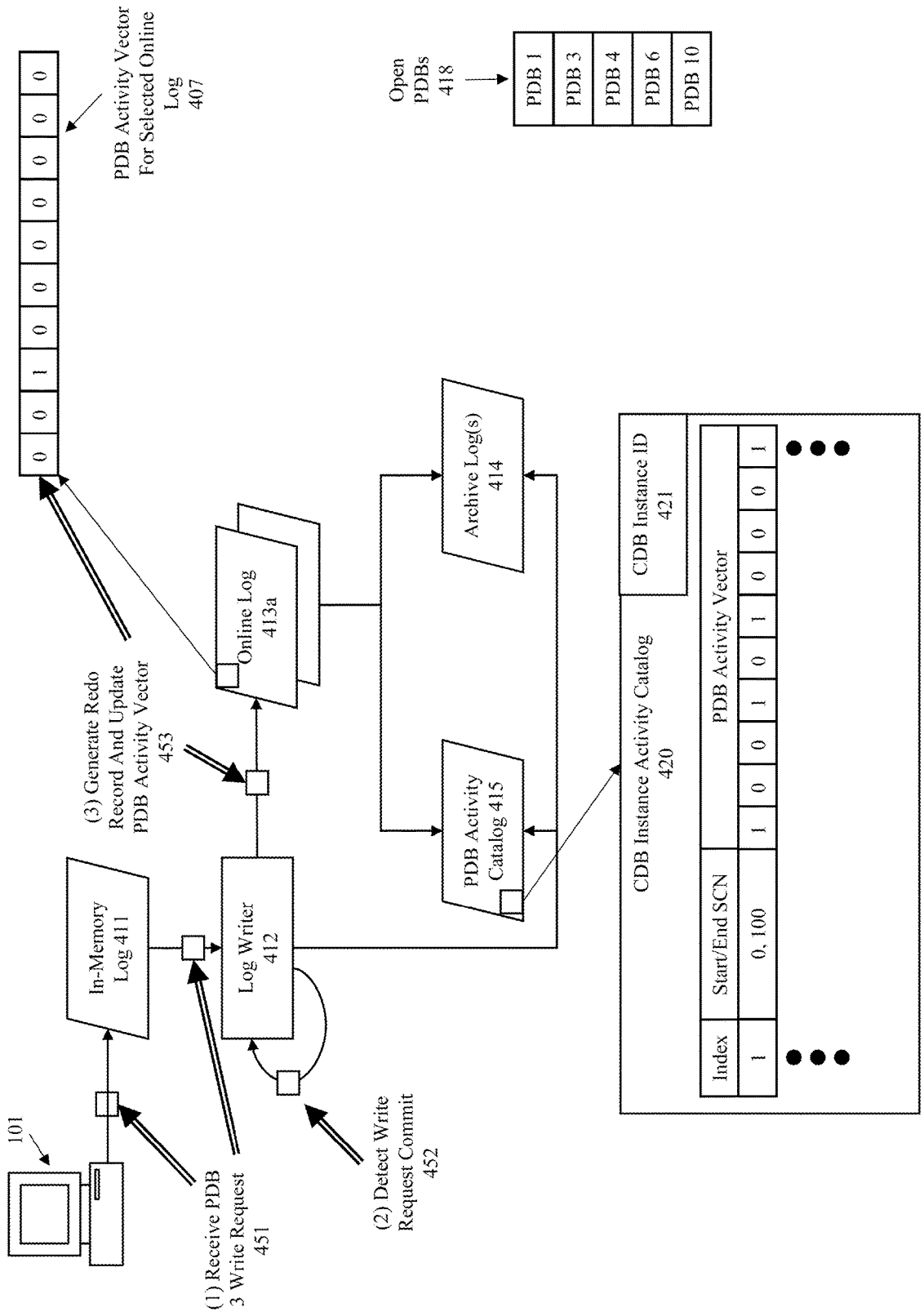

FIG. 4B illustrates the receipt of a PDB write request to PDB 3 at 451. This write request is passed to the log writer 412, which detects that the write request is committed at 452. In response to this detection, the log writer 412 generates a redo record and updates the PDB activity vector at 453. As a result, the redo record is written into the currently selected online log 413*a* and the PDB activity vector is updated by setting the corresponding bit to indicate that PDB 3 is active during the period represented in the currently selected online log.

Figure 4C:
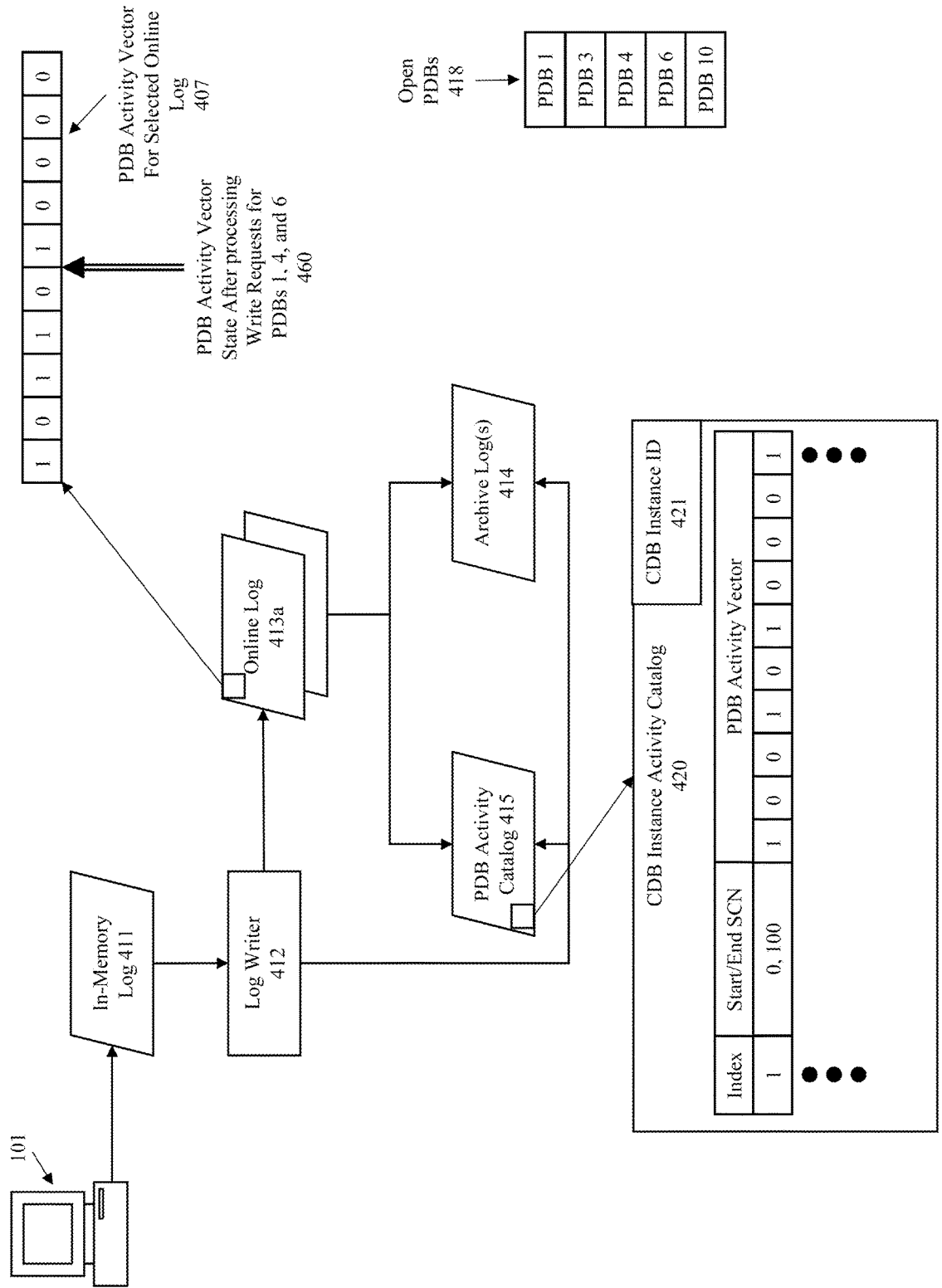

FIG. 4C illustrates the PDB activity vector 407 after redo records have been captured in the online log as indicated at 460. In particular, the PDB activity vector now also indicates that PDB 1, 4, and 6 have also been active during the period represented in the currently selected online log in addition to PDB 3.

Figure 4D:
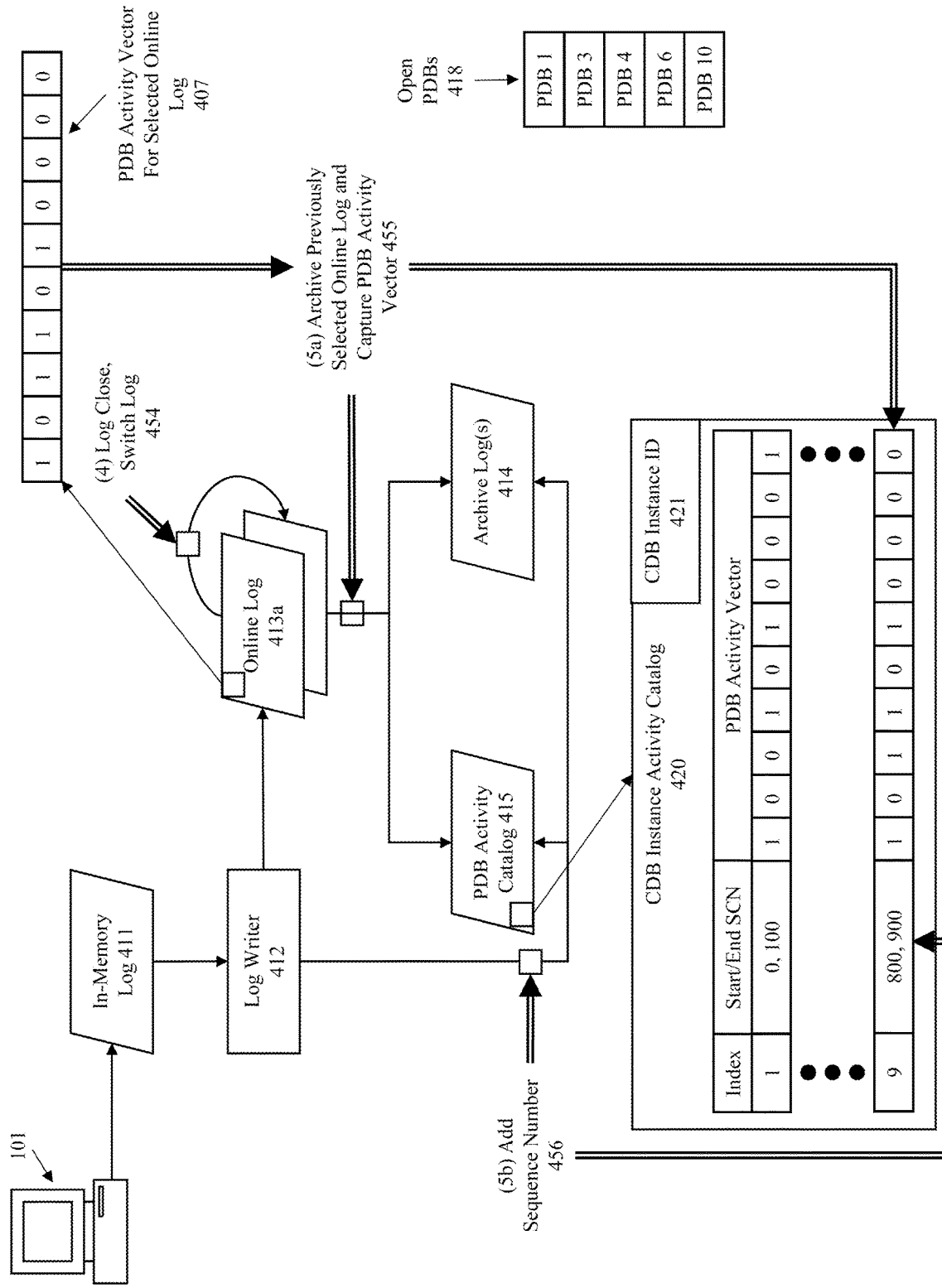

FIG. 4D illustrates log closing and subsequent operations associated with the now closed log.

The process starts when the current log is closed at 454. Once closed, the PDB activity vector 407 is captured at 455 in the CDB instance activity catalog. This might comprise creating a new entry identified by an index in a relational database table. The entry includes the capture PDB activity vector 407 and in some embodiments the start and end SCN (see e.g., 456 where a sequence number is provided by the log writer to the catalog and possible the archive log) that corresponds to the now closed activity log.

FIGS. 5A-5D illustrate an example flow for a portion of the process to maintain an activity log that summarizes pluggable database (PDB) write activity for consolidated database instance(s) where multiple processes operate on an online log according to some embodiments. FIGS. 5A-5D illustrate multiple processes operating on the same online log whereas FIGS. 4A-4D provided a simplified illustration where the online log was represented as being operated on by only a single process.

Figure 5A:
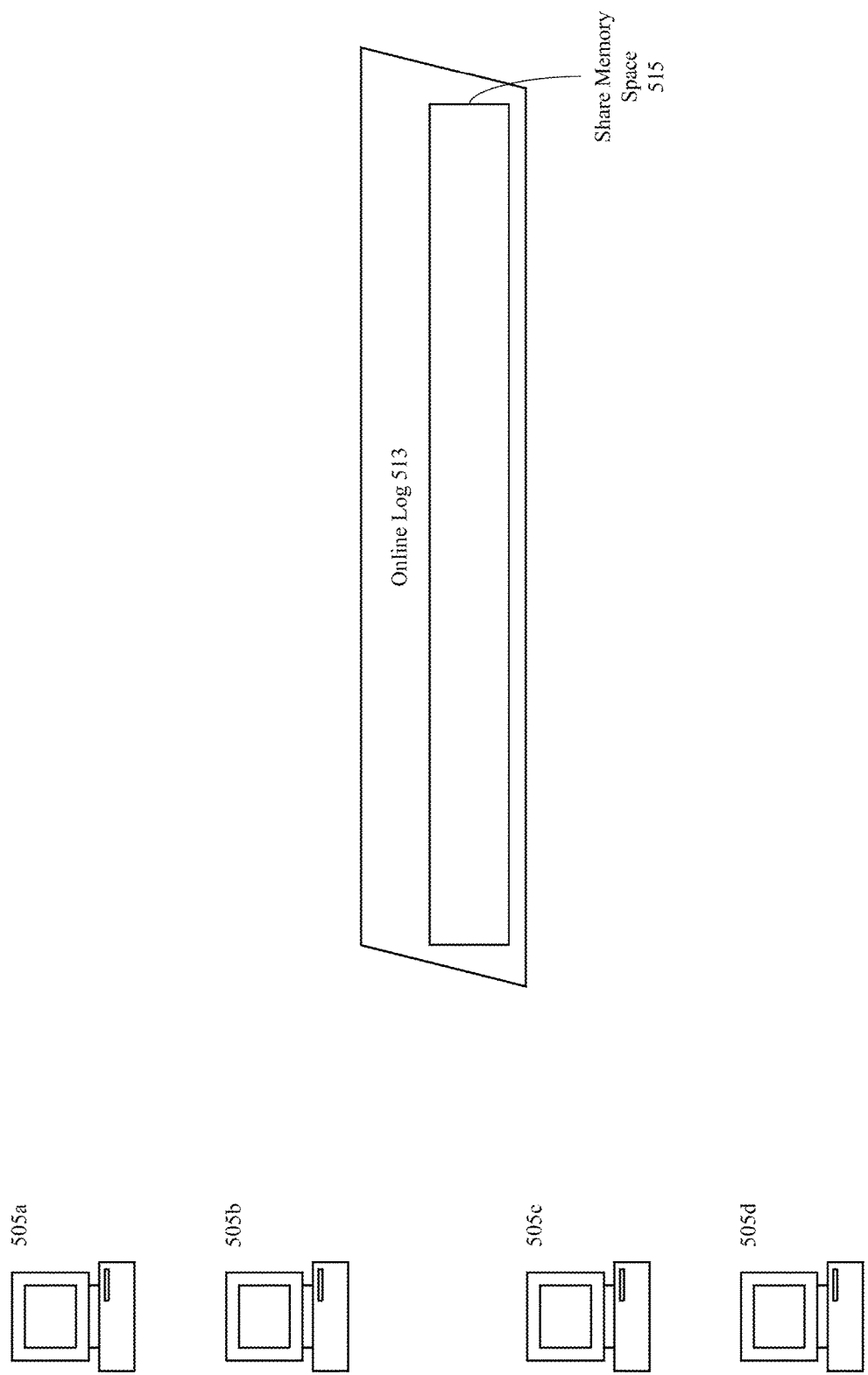
FIGS. 5A-5D illustrate an example flow for a portion of the process to maintain an activity log that summarizes pluggable database (PDB) write activity for consolidated database instance(s) where multiple processes operate on an online log according to some embodiments.
Figure 5B:
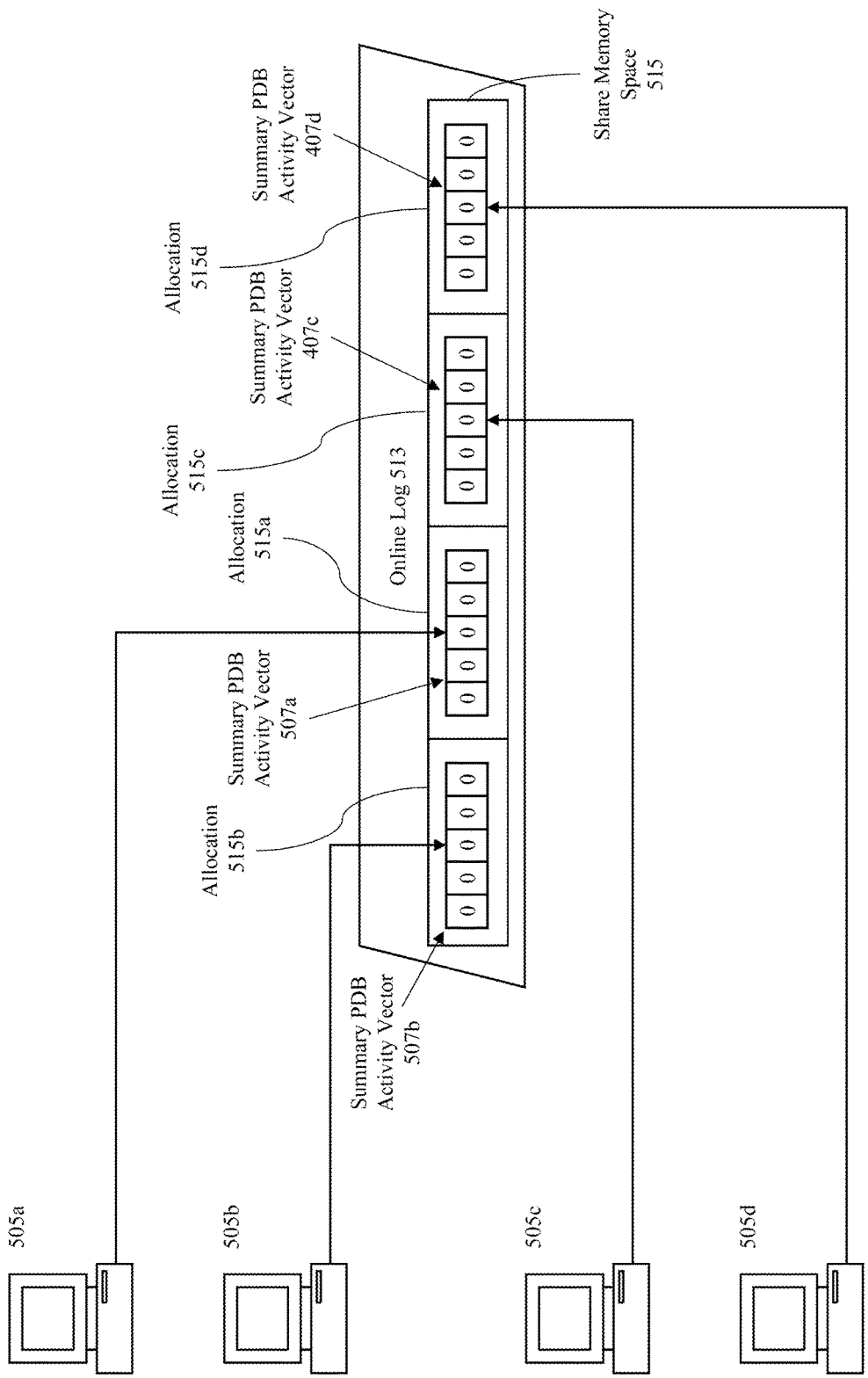

FIG. 5A illustrates four processes operating on four computing devices 505*a-d* and an online log 513 having a shared memory space 515. FIG. 5B builds on this arrangement to illustrate the partitioning of the share memory space for the online log to provide an allocation to each process on each computing device. For example, 505*a* is allocated the portion at 515*a*, 505*b* is allocated the portion at 515*b*, 505*c* is allocated the portion at 515*c*, and 505*d* is allocated the portion at 515*d*, where each respective allocation includes a summary PDB activity vector 507*a-d* that corresponds to the process in which the PDB activity vector is included (to simplicity the illustration, here the activity vectors have only 5 entries each). Thus, for a single CDB instance, multiple processes are provided that each are allocated a different portion of the online log 513. As illustrated, the online log is currently empty as none of the activity vectors 507*a-d* indicate any activity.

Figure 5C:
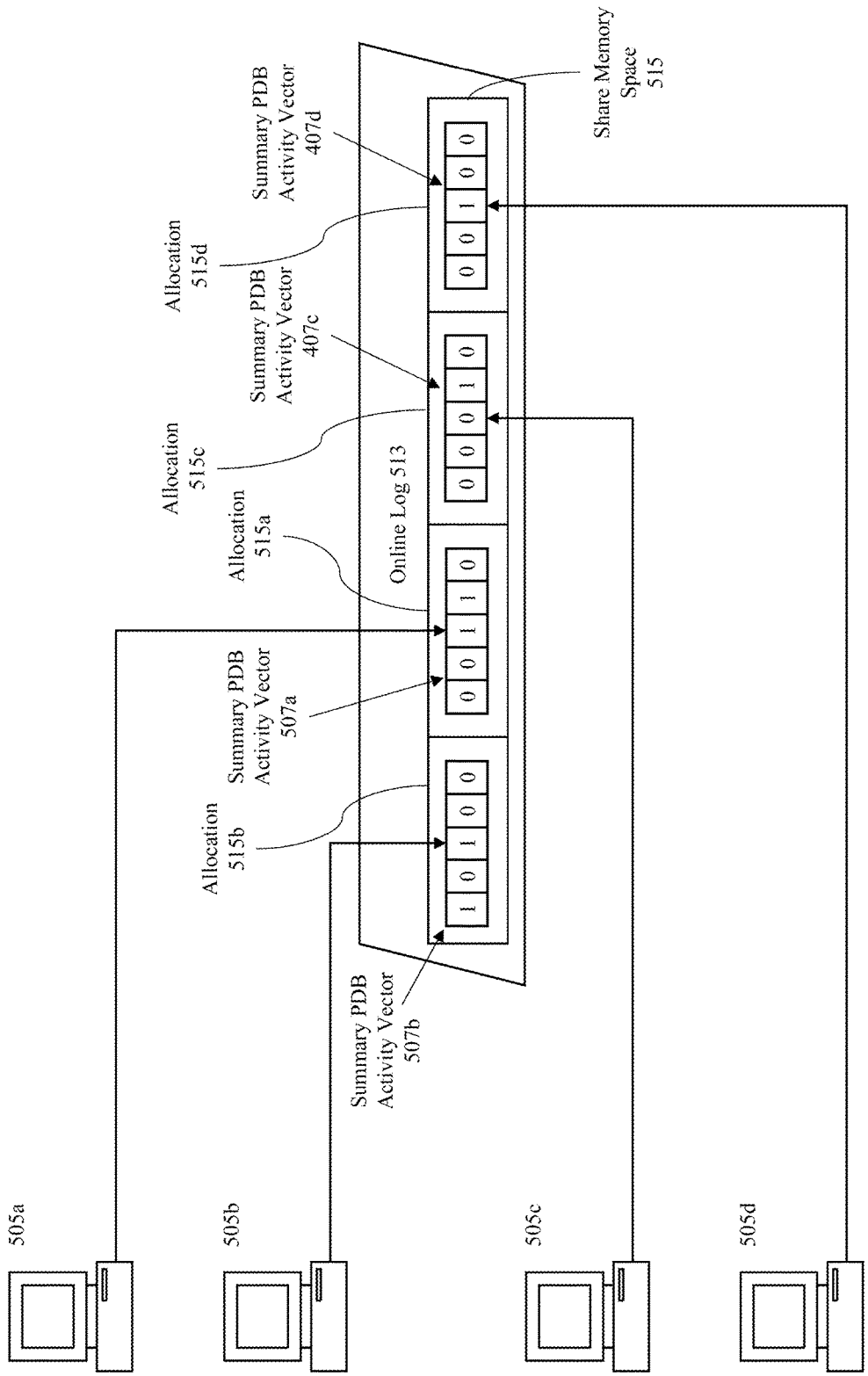

FIG. 5C illustrates the same arrangement after there has been activity for each of the four processes. In particular, PDB activity vector 507*a* indicates that PDBs 3 and 4 where active, PDB activity vector 507*b* indicates that PDBs 1 and 3 where active, PDB activity vector 507*c* indicates that PDB 4 was active, and PDB activity vector 507*d* indicates that PDB 3 was active.

Figure 5D:
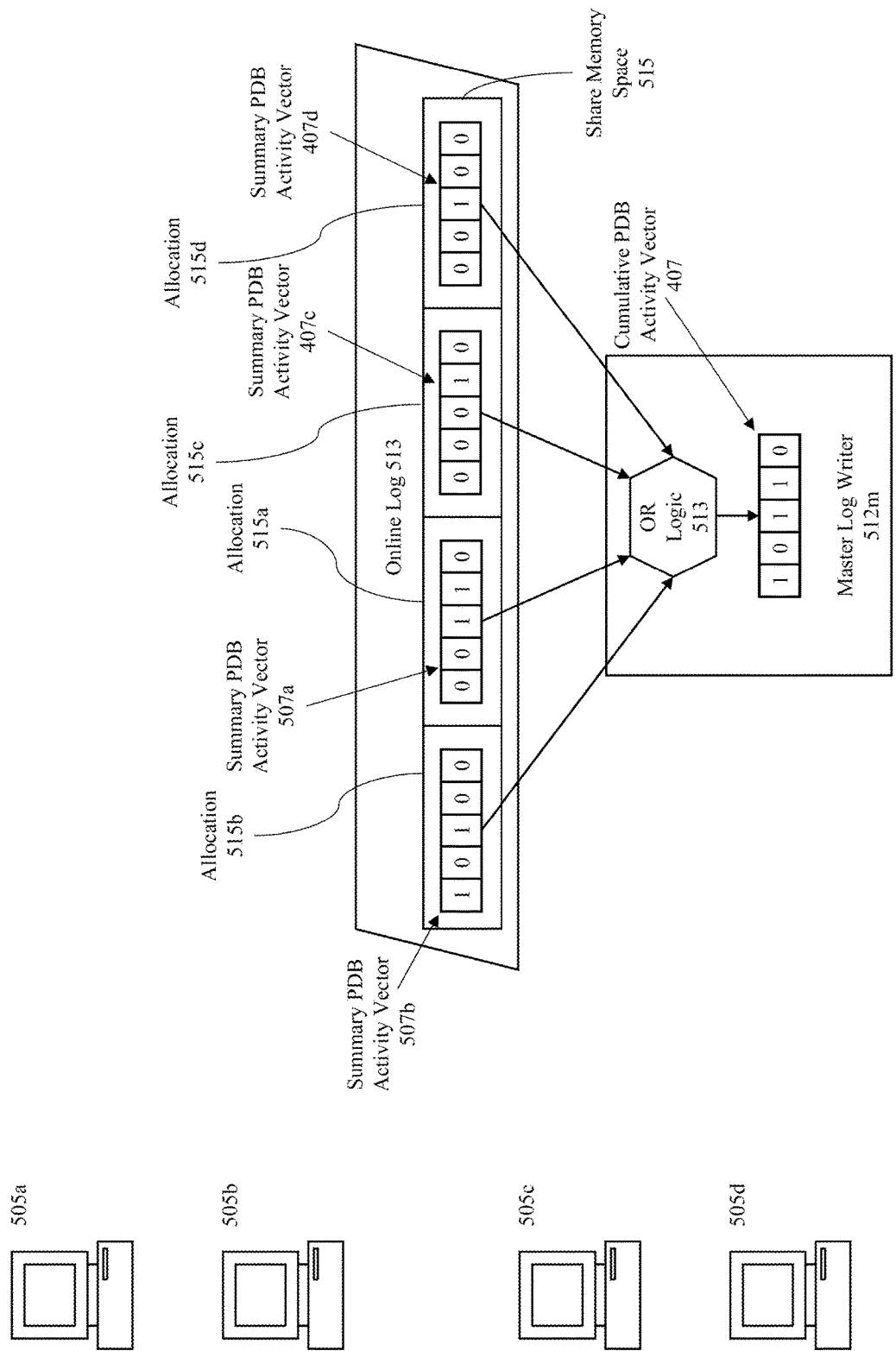

FIG. 5D illustrates the same arrangement after the above activity and after the online log has been closed. As illustrated, each of the PDB activity vectors 507*a-d* are OR'd together at 513 to get a cumulative PDB activity vector 407. This could be implemented by any of the computing devices 505*a-d* or a separate computing device/process. As illustrated a master log writer 512*m* processes the PDB activity vectors 507*a-d*, where the master log writer could be identified based on one or more rules and circumstances or could be a preselected log writer process.

Figure 6:
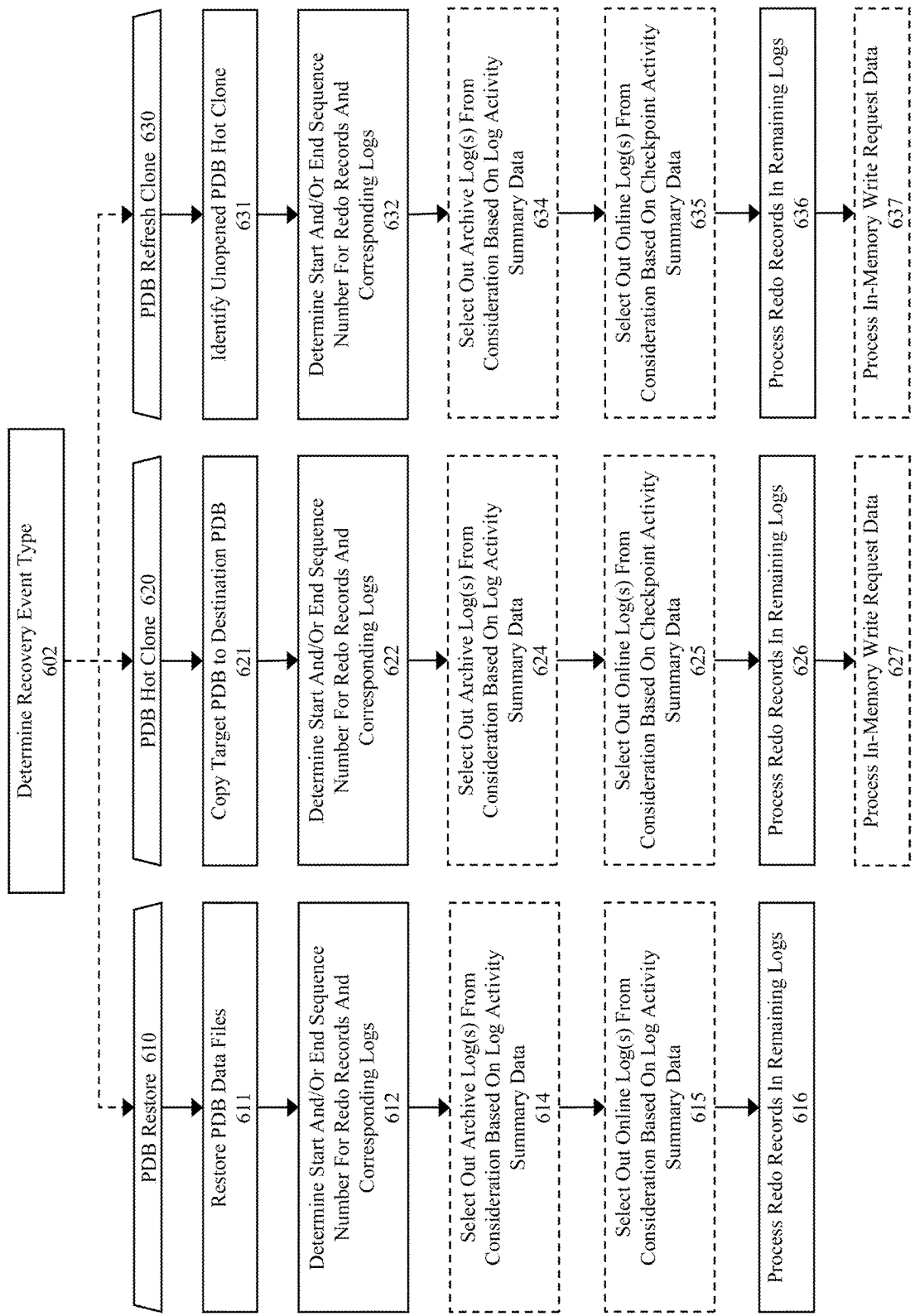
FIG. 6 is a more detailed flowchart to perform pluggable database recovery by at least identifying log data for recovery based on at least log summary data according to some embodiments.

FIG. 6 is a more detailed flowchart to perform pluggable database recovery by at least identifying log data for recovery based on at least log summary data according to some embodiments. As illustrated the recovery process can be implemented for three different types of recovery events.

The flow starts at 602 where a recovery event type is determined. In some embodiments, the recovery event type is specified in a recovery request. In some embodiments, the recovery event type is determined based on one or more parameters stored in a specified location. For example, an automated process might trigger a recovery event and may also specify a location of metadata which was used to determine that a recovery event should occur. One or more rules might be used to determine the recovery type. Depending on the determined recovery event type the recovery operation will proceed at 610, 620, or 630.

At 610 a PDB restore operation is initiated. This process starts by restoring the PDB data files to a target location at 611. The PDB data files may be restored from a local copy (e.g., in database 120) or from a copy at a remote location generated by a backup process (e.g., in database 130). Generally, the data files are capture only on a point in time basis. Subsequently, one or more incremental data file backups might be applied. Once all relevant data files and incremental data file backups are applied the process continues at 612.

At 612 a start and/or end sequence number for redo records is determined and used to identify corresponding logs. For instance, the recovery request includes a specified time (that can be mapped to a sequence number) or sequence number for the restoration. This sequence number, in combination with the last sequence number for the PDB data files, can then be used to identify any potentially relevant logs, as each log for each CDB instance will be associated with a sequence number. For example, archive log and online log catalog data is analyzed to determine which logs from any number of CDB instances overlap with the relevant sequence number range.

In some embodiments, the relevant logs include one or more archived logs. In such an event, the irrelevant archive logs are selected out when corresponding log activity summary data indicates that the respective logs did not have activity within the specified sequence range at 614 for the particular PDB. For instance, one or move activity vectors are analyzed within the CDB database catalog to determine if the target PDB was active during the sequence range represented by a corresponding entry in the catalog. Where the PDB was not active, the corresponding archived logs are excluded from processing (e.g., from a list of logs to be processed). Similarly, in some embodiments the online logs are processed using the activity vector(s) in the corresponding online log(s) to determine if those logs are relevant to the recovery event. Finally, at 616, the redo records in the remaining logs are processed against the restored data files discussed in 611.

The PDB hot clone 620 is similar to the PDB restore operation 610. In particular, the operations of 622, 624, 625, and 626 are equivalent to 612, 614, 615, and 616 respectively. However, instead of restoring PDB data files as discussed at 611, the process starts at 621 by copying a currently healthy target PDB to a destination PDB. This process generally comprises copying the committed content(s) of the target PDB to a new PDB located at a destination location. However, such copy operations are not instant. Thus, it is common for additional operations to be committed to the target PDB while the copy operation is in progress. In some embodiments, to address the subsequent operations that are committed after the start of the copy operation, the process identifies the current sequence number at the start of the copy operation to identify any redo records to be applied to the destination PDB to bring it up to date after the initial copying. Additionally, in some embodiments, in-memory write request data is copied to a relevant location at the destination PDB at 627. This in-memory data corresponds to any difference between the current committed state of the PDB and pending write operations for the target PDB.

The PDB refresh clone 630 is similar to the PDB hot clone 630. In particular, the operations of 632, 634, 635, 636 are equivalent to 622, 624, 625, 626 respectively. However, instead of copying a target PDB to a destination PDB as discussed at 621, the process starts at 631 by identifying an unopened or unmodified clone. Specifically, to refresh a clone, the clone must not be modified in a way that is contrary to the target PDB. The process then continues to address subsequent operations that occurred after the completion of the PDB hot clone operation to bring it up to date.

Figure 7A:
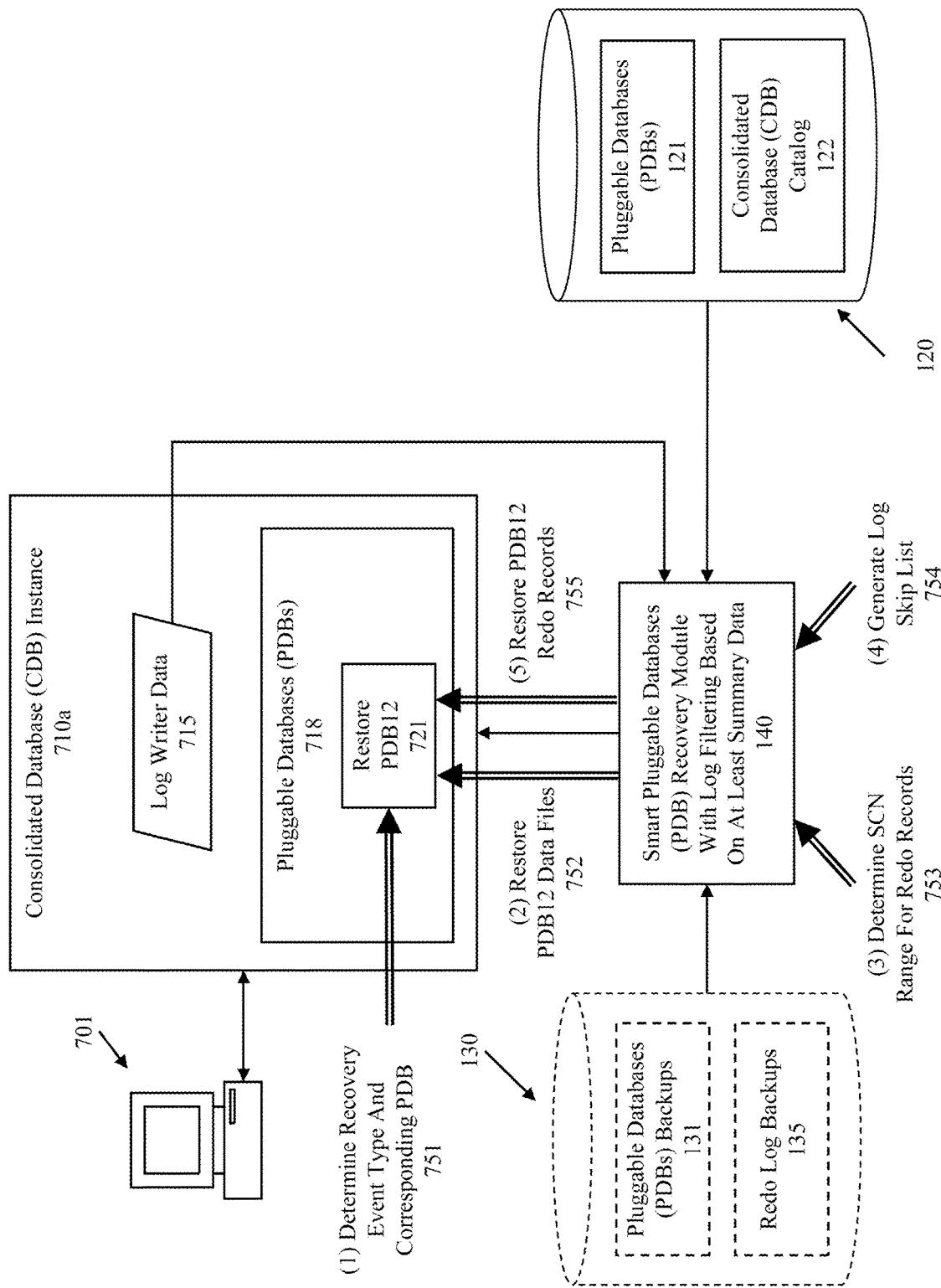
FIGS. 7A-7C illustrate example flows for portions of the process to perform pluggable database recovery by at least identifying log data for recovery based on at least log summary data according to some embodiments.
Figure 7B:
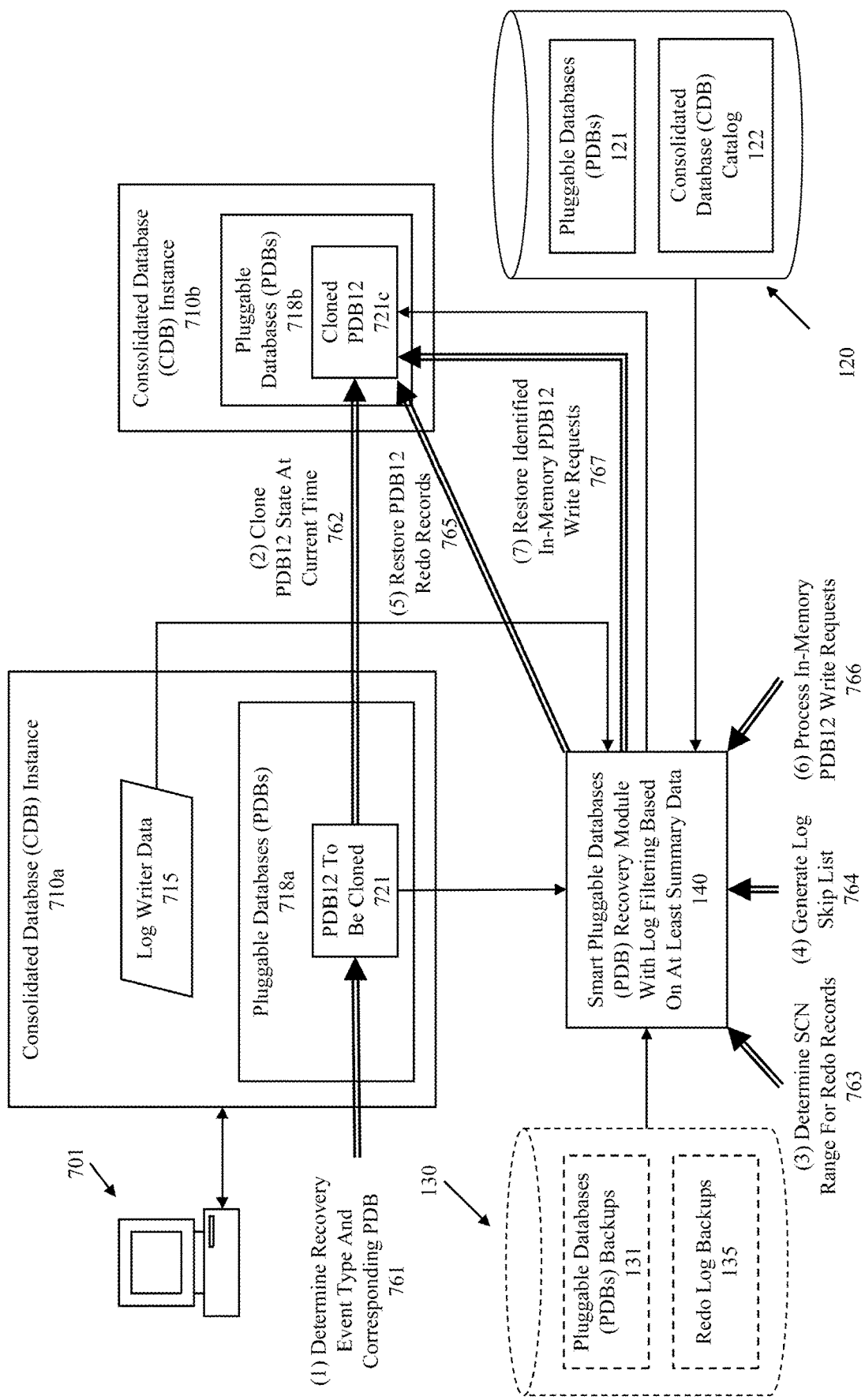
Figure 7C:
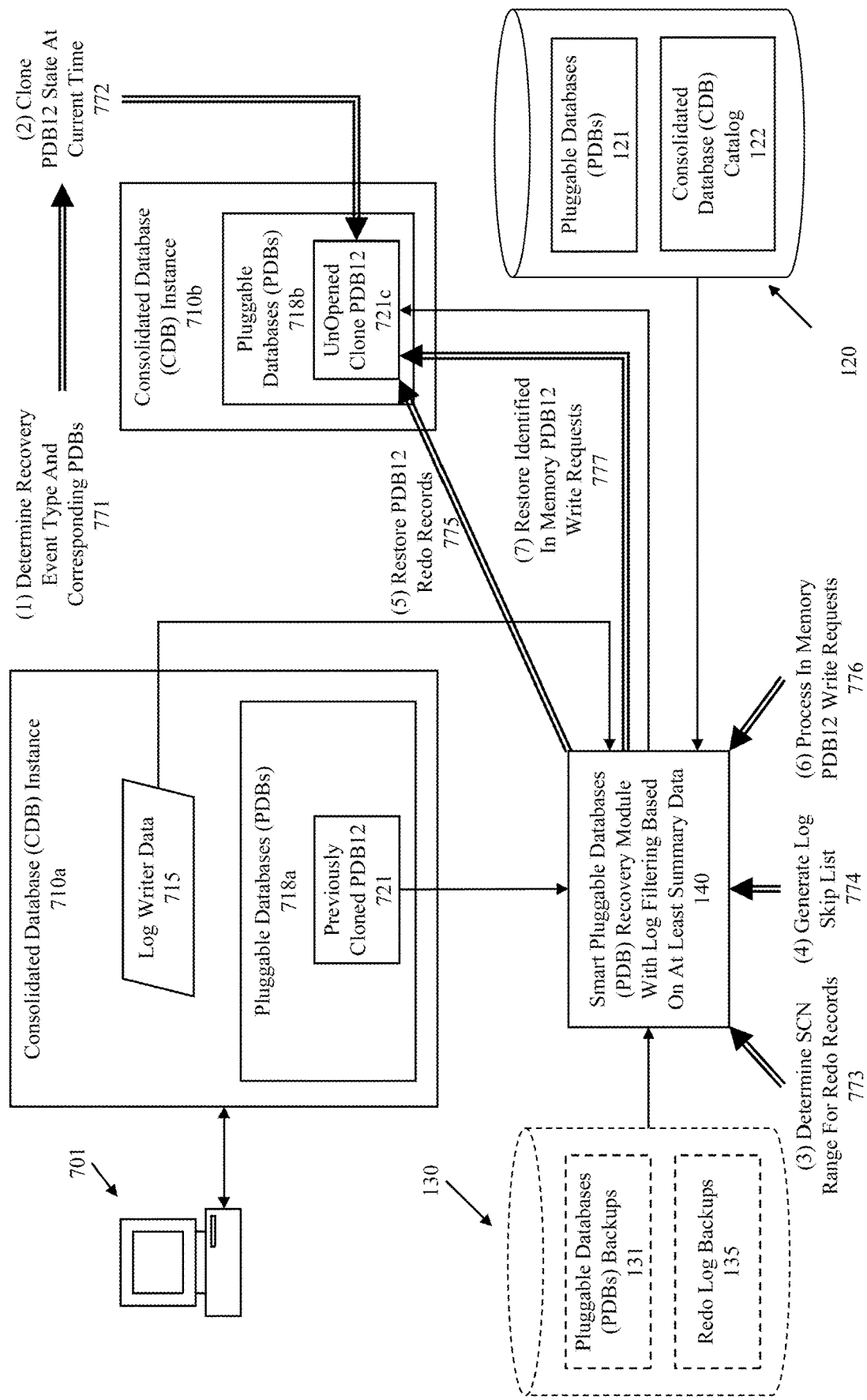

FIGS. 7A-7C illustrate example flows for portions of the process to perform pluggable database recovery by at least identifying log data for recovery based on at least log summary data according to some embodiments.

FIG. 7A illustrates an example flow for the PDB restore operation 610 according to some embodiments.

As illustrated, a computing device 701 may trigger a recovery event for a consolidated database instance 710a that includes log writer data 715, and any number of open pluggable databases. Here, the recovery event type and corresponding PDB is determined to be a restore of PDB 12 (see 721).

First, the data files for the PDB 12 are restored from a source location (see 752) by the smart pluggable database recovery module with log filtering on at least summary data 140. In some embodiments, all data files are restored from a local database 120 which includes the PDBs 121 and a consolidated database catalog 122. In some embodiments, some or all of the PDB files are restored from a backup using the smart recovery module (and possibly an RMAN process which may or may not be integrated within the smart recovery module 140).

In addition to recovery of the data files directly, redo records can also be processed. This processing is similar to that discussed above in regard to FIG. 6 and includes determining an SCN range for redo records 753, generating a skip list (or alternatively a process list) at 754 based on the activity vectors in the consolidated database catalog 122, and restoring PDB 12 using only the identified/non-excluded log files. Furthermore, where a remote backup is involved, such as redo log backups 135, the skip list can be used to avoid fetching logs that do not include activity for the PDB being restored (PDB 12).

FIG. 7B illustrates an example flow for the PDB hot clone operation 620 according to some embodiments.

As illustrated, a computing device 701 may trigger a recovery event for a consolidated database instance 710a that includes log writer data 715 and any number of open pluggable databases. Here, the recovery event type and corresponding PDB is determined to be a hot clone of PDB 12 (see 721). For example, PDB 12 after restoration as discussed in FIG. 7.

First, the current data files for the PDB 12 are copied from a current location (e.g., pluggable databases 121) by the smart pluggable database recovery module with log filtering on at least summary data 140 (see 762). This may correspond to creating a new PDB (e.g., PDB 20 which we will call PDB 12 clone for simplicity) in the pluggable database 121. This clone may be opened in a different consolidated database instance 710b as illustrated here, in the same consolidated database, or at a different location entirely (e.g., to another network environment).

In addition to copying the current data files, redo records can also be processed. This processing is similar to that discussed above in regard to FIGS. 6 and 7A and includes determining an SCN range for redo records 763, generating a skip list (or alternatively a process list) at 764 based on activity vectors in the consolidated database catalog 122, and restoring PDB 12 redo records using the only the identified/non-excluded log files 762. Furthermore, where a remote backup is involved, such as redo log backups 135, the skip list can be used to avoid fetching logs that do not include activity for the PDB being restored (PDB 12). In some embodiments, the process also includes processing any in-memory write request at 766 and reproducing any in-memory write requests for PDB 12 in an in-memory log for the cloned PDB 12 (see 767).

FIG. 7C illustrates an example flow for the PDB clone refresh operation 630 according to some embodiments.

As illustrated, a computing device 701 may trigger a recovery event for a consolidated database instance 710*a* that includes log writer data 715, and any number of open pluggable databases. Here, the recovery event type and corresponding PDB is determined to be a refresh clone operation (see 771) on the unopened clone of PDB 12 (see 721).

First, the unopened clone of PDB 12 (see 721*c*) is analyzed to determine the corresponding last sequence number that the clone encompasses (see 772). Then, redo records are processed against the clone to reach a current state of the previously cloned PDB 12 (see 721). This processing is similar to that discussed above in regard to FIGS. 6 and 7B and includes determining an SCN range for redo records 773, generating a skip list (or alternatively a process list) at 774 based on the activity vectors in the consolidated database catalog 122, and restoring PDB 12 redo records using the only the identified/non-excluded log files 772. Furthermore, where a remote backup is involved, such as redo log backups 135, the skip list can be used to avoid fetching logs that do not include activity for the PDB being restored (PDB 12). In some embodiments, the process also includes processing any in-memory write request at 776 and reproducing any in-memory write requests for PDB 12 in the in-memory log for the cloned PDB 12 (see 777).

System Architecture

Figure 8:
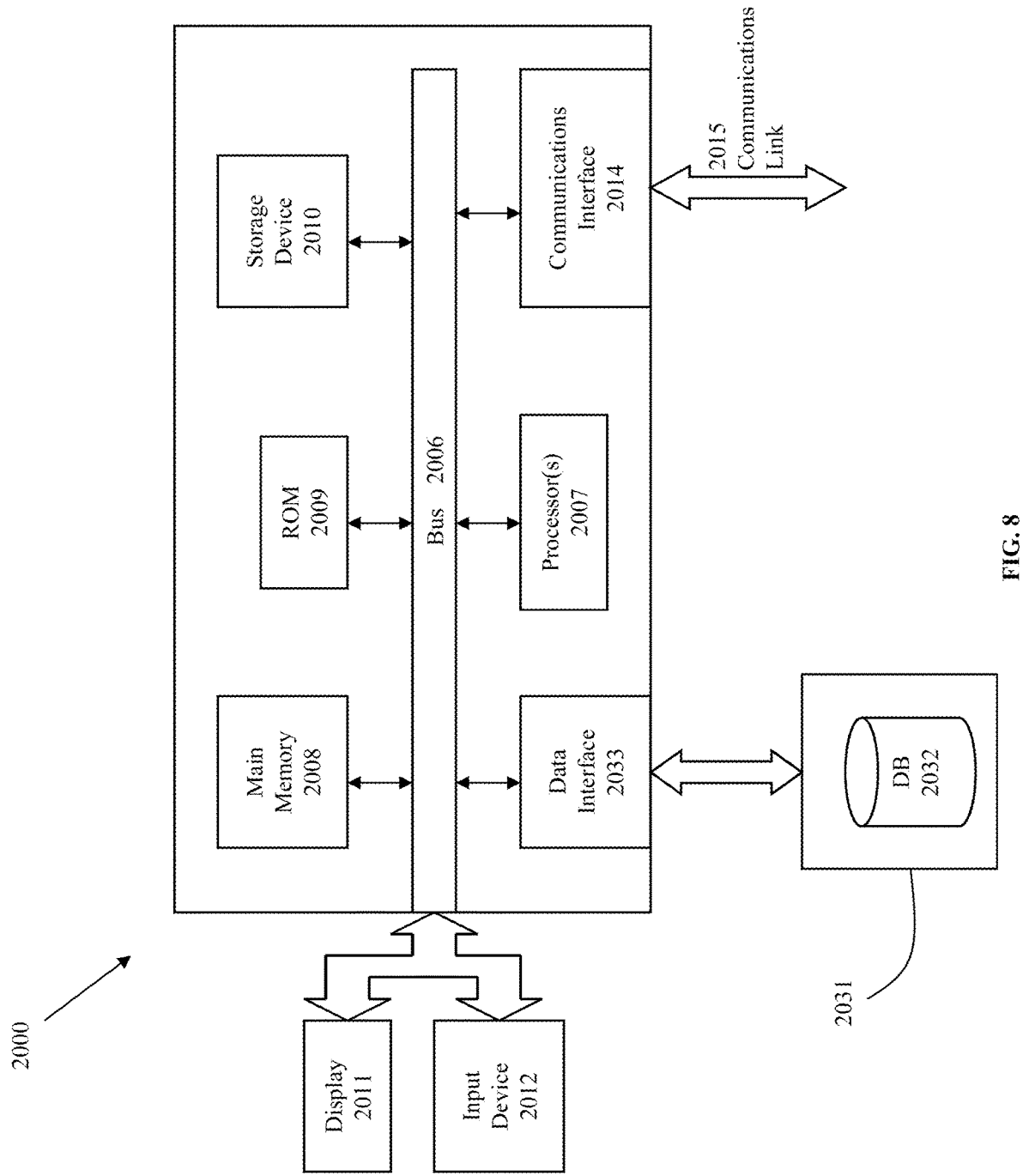
FIG. 8 is a diagram of a computing system suitable for implementing an embodiment of the present disclosure.

FIG. 8 is a block diagram of an illustrative computing system 2000 suitable for implementing an embodiment of the present invention. Computer system 2000 includes a bus 2006 or other communication mechanism for communicating information, which interconnects subsystems and devices, such as processor 2007, system memory 2008 (e.g., RAM), static storage device 2009 (e.g., ROM), disk drive 2010 (e.g., magnetic or optical), communication interface 2014 (e.g., modem or Ethernet card), display 2011 (e.g., CRT or LCD), input device 2012 (e.g., keyboard), and cursor control.

According to one embodiment of the invention, computer system 2000 performs specific operations by processor 2007 executing one or more sequences of one or more instructions contained in system memory 2008. Such instructions may be read into system memory 2008 from another computer readable/usable medium, such as static storage device 2009 or disk drive 2010. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 2007 for execution. Such a medium may take many forms, including but not limited to, non-volatile media and volatile media. Non-volatile media includes, for example, optical or magnetic disks, such as disk drive 2010. Volatile media includes dynamic memory, such as system memory 2008.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 2000. According to other embodiments of the invention, two or more computer systems 2000 coupled by communication link 2015 (e.g., LAN, PTSN, or wireless network) may perform the sequence of instructions required to practice the invention in coordination with one another.

Computer system 2000 may transmit and receive messages, data, and instructions, including program, i.e., application code, through communication link 2015 and communication interface 2014. Received program code may be executed by processor 2007 as it is received, and/or stored in disk drive 2010, or other non-volatile storage for later execution. Data may be accessed from a database 2032 that is maintained in a storage device 2031, which is accessed using data interface 2033.

Figure 9:
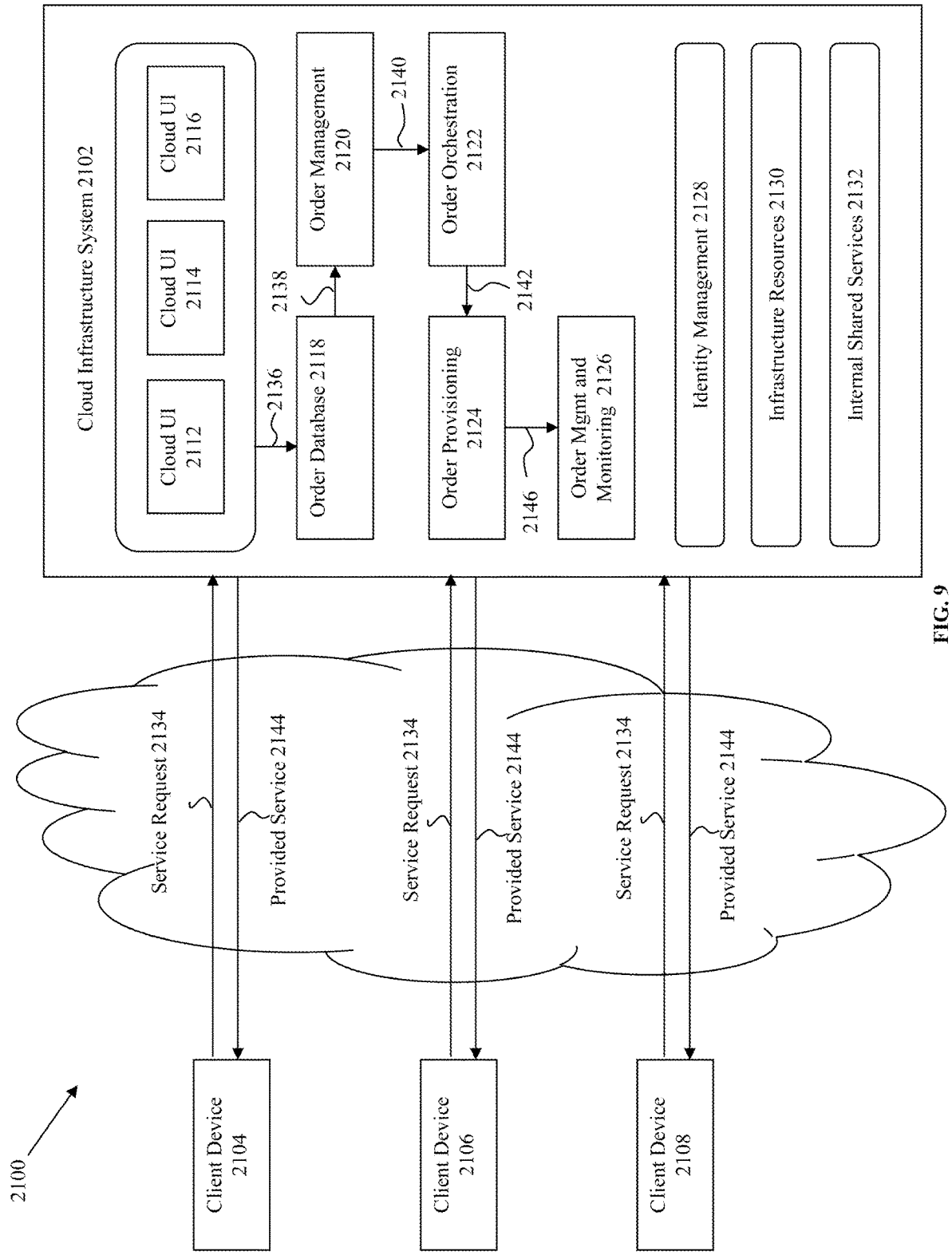
FIG. 9 is a block diagram of one or more components of a system environment in which services may be offered as cloud services, in accordance with an embodiment of the present invention.

FIG. 9 is a simplified block diagram of one or more components of a system environment 2100 by which services provided by one or more components of an embodiment system may be offered as cloud services, in accordance with an embodiment of the present disclosure. In the illustrated embodiment, system environment 2100 includes one or more client computing devices 2104, 2106, and 2108 that may be used by users to interact with a cloud infrastructure system 2102 that provides cloud services. The client computing devices may be configured to operate a client application such as a web browser, a proprietary client application, or some other application, which may be used by a user of the client computing device to interact with cloud infrastructure system 2102 to use services provided by cloud infrastructure system 2102.

It should be appreciated that cloud infrastructure system 2102 depicted in the figure may have other components than those depicted. Further, the embodiment shown in the figure is only one example of a cloud infrastructure system that may incorporate an embodiment of the invention. In some other embodiments, cloud infrastructure system 2102 may have more or fewer components than shown in the figure, may combine two or more components, or may have a different configuration or arrangement of components.

Client computing devices 2104, 2106, and 2108 may be devices similar to those described above for FIG. 7. Although system environment 2100 is shown with three client computing devices, any number of client computing devices may be supported. Other devices such as devices with sensors, etc. may interact with cloud infrastructure system 2102.

Network(s) 2110 may facilitate communications and exchange of data between clients 2104, 2106, and 2108 and cloud infrastructure system 2102. Each network may be any type of network familiar to those skilled in the art that can support data communications using any of a variety of commercially available protocols. Cloud infrastructure system 2102 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2102 may include a suite of applications, middleware, and database service offerings that are delivered to a customer in a self-service, subscription-based, elastically scalable, reliable, highly available, and secure manner.

In various embodiments, cloud infrastructure system 2102 may be adapted to automatically provision, manage and track a customer's subscription to services offered by cloud infrastructure system 2102. Cloud infrastructure system 2102 may provide the cloud services via different deployment models. For example, services may be provided under a public cloud model in which cloud infrastructure system 2102 is owned by an organization selling cloud services and the services are made available to the general public or different industry enterprises. As another example, services may be provided under a private cloud model in which cloud infrastructure system 2102 is operated solely for a single organization and may provide services for one or more entities within the organization. The cloud services may also be provided under a community cloud model in which cloud infrastructure system 2102 and the services provided by cloud infrastructure system 2102 are shared by several organizations in a related community. The cloud services may also be provided under a hybrid cloud model, which is a combination of two or more different models.

In some embodiments, the services provided by cloud infrastructure system 2102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2102. Cloud infrastructure system 2102 then performs processing to provide the services in the customer's subscription order.

In some embodiments, the services provided by cloud infrastructure system 2102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2102 may also include infrastructure resources 2130 for providing the resources used to provide various services to customers of the cloud infrastructure system. In one embodiment, infrastructure resources 2130 may include pre-integrated and optimized combinations of hardware, such as servers, storage, and networking resources to execute the services provided by the PaaS platform and the SaaS platform.

In some embodiments, resources in cloud infrastructure system 2102 may be shared by multiple users and dynamically re-allocated per demand. Additionally, resources may be allocated to users in different time zones. For example, cloud infrastructure system 2130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2132 may be provided that are shared by different components or modules of cloud infrastructure system 2102 and by the services provided by cloud infrastructure system 2102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 2102 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 2102, and the like.

In one embodiment, as depicted in the figure, cloud management functionality may be provided by one or more modules, such as an order management module 2120, an order orchestration module 2122, an order provisioning module 2124, an order management and monitoring module 2126, and an identity management module 2128. These modules may include or be provided using one or more computers and/or servers, which may be general purpose computers, specialized server computers, server farms, server clusters, or any other appropriate arrangement and/or combination.

In operation 2134, a customer using a client device, such as client device 2104, 2106 or 2108, may interact with cloud infrastructure system 2102 by requesting one or more services provided by cloud infrastructure system 2102 and placing an order for a subscription for one or more services offered by cloud infrastructure system 2102. In certain embodiments, the customer may access a cloud User Interface (UI), cloud UI 2112, cloud UI 2114 and/or cloud UI 2116 and place a subscription order via these UIs. The order information received by cloud infrastructure system 2102 in response to the customer placing an order may include information identifying the customer and one or more services offered by the cloud infrastructure system 2102 that the customer intends to subscribe to.

After an order has been placed by the customer, the order information is received via the cloud UIs, 2112, 2114 and/or 2116. At operation 2136, the order is stored in order database 2118. Order database 2118 can be one of several databases operated by cloud infrastructure system 2118 and operated in conjunction with other system elements. At operation 2138, the order information is forwarded to an order management module 2120. In some instances, order management module 2120 may be configured to perform billing and accounting functions related to the order, such as verifying the order, and upon verification, booking the order. At operation 2140, information regarding the order is communicated to an order orchestration module 2122. Order orchestration module 2122 may utilize the order information to orchestrate the provisioning of services and resources for the order placed by the customer. In some instances, order orchestration module 2122 may orchestrate the provisioning of resources to support the subscribed services using the services of order provisioning module 2124.

In certain embodiments, order orchestration module 2122 enables the management of business processes associated with each order and applies business logic to determine whether an order should proceed to provisioning. At operation 2142, upon receiving an order for a new subscription, order orchestration module 2122 sends a request to order provisioning module 2124 to allocate resources and configure those resources needed to fulfill the subscription order. Order provisioning module 2124 enables the allocation of resources for the services ordered by the customer. Order provisioning module 2124 provides a level of abstraction between the cloud services provided by cloud infrastructure system 2102 and the physical implementation layer that is used to provision the resources for providing the requested services. Order orchestration module 2122 may thus be isolated from implementation details, such as whether or not services and resources are actually provisioned on the fly or pre-provisioned and only allocated/assigned upon request.

At operation 2144, once the services and resources are provisioned, a notification of the provided service may be sent to customers on client devices 2104, 2106 and/or 2108 by order provisioning module 2124 of cloud infrastructure system 2102.

At operation 2146, the customer's subscription order may be managed and tracked by an order management and monitoring module 2126. In some instances, order management and monitoring module 2126 may be configured to collect usage statistics for the services in the subscription order, such as the amount of storage used, the amount data transferred, the number of users, and the amount of system up time and system down time.

In certain embodiments, cloud infrastructure system 2102 may include an identity management module 2128. Identity management module 2128 may be configured to provide identity services, such as access management and authorization services in cloud infrastructure system 2102. In some embodiments, identity management module 2128 may control information about customers who wish to utilize the services provided by cloud infrastructure system 2102. Such information can include information that authenticates the identities of such customers and information that describes which actions those customers are authorized to perform relative to various system resources (e.g., files, directories, applications, communication ports, memory segments, etc.) Identity management module 2128 may also include the management of descriptive information about each customer and about how and by whom that descriptive information can be accessed and modified.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

Additionally, the approach disclosed herein for efficient pluggable database recovery with redo filtering in a consolidated database that addresses some of the issues of prior techniques suffer from, such as the necessity to process activity logs even when those activity logs do not have relevant redo records for a pluggable database. Instead, the approach provided herein utilizes a consolidated database catalog to select out logs that do not include relevant redo records.

What is claimed is:

1. A computer-implemented method comprising:
   maintaining a set of log activity summary data, the set of log activity summary data representing which pluggable databases in one or more consolidated database instances are modified during respective time periods;
   detecting a pluggable database recovery event; and
   performing, in response to detecting the pluggable database recovery event, pluggable database recovery by at least processing the set of log activity summary data to determine during which time periods of the respective time periods one or more corresponding pluggable databases were modified and identifying log data for recovery based at least in part on the determined time periods.

2. The method of claim 1, wherein the set of log activity summary data comprises an activity flag, and maintaining the set of log activity summary data comprises:
   receiving a write request to a pluggable database;
   capturing the write request in an in-memory log;
   generating a redo record for the write request in an online activity log; and
   updating the activity flag for the pluggable database, wherein the activity flag indicates that the pluggable database was active during a period of time corresponding to the online activity log.

3. The method of claim 2, wherein maintaining the set of log activity summary data further comprises:
   archiving the online activity log, and
   capturing pluggable database activity summary data for the archived online activity log in a consolidated database activity catalog.

4. The method of claim 2, wherein the online activity log has a plurality of segments in a shared memory space and respective segments of the plurality of segments are allocated to respective computing devices and have respective pluggable database activity summary data.

5. The method of claim 4, wherein the respective pluggable database activity summary data in each respective segment of the plurality of segments are combined into a single vector using a logical or operation.

6. The method of claim 1, wherein performing, in response to detecting the pluggable database recovery event, the pluggable database recovery by at least identifying log data for recovery based on the set of log activity summary data comprises at least determining a recovery event type, wherein the recover event type comprises one of a pluggable database restore, a pluggable database hot clone, a pluggable database refresh clone.

7. The method of claim 6, further comprising selecting out one or more logs based on the set of log activity summary data.

8. The method of claim 1, wherein:
   multiple sets of log activity summary data summarize write activity over multiple pluggable databases in respective one or more consolidated database instances, and each consolidated database instance of multiple consolidated database instances is associated with a respective set of the sets of log activity summary data,
   performing, in response to detecting the pluggable database recovery event, the pluggable database recovery by at least identifying log data for recovery based on two or more of the multiple sets of log activity summary data, and
   one or more logs are selected out from processing during the pluggable database recovery based on the set of log activity summary data.

9. The method of claim 1, wherein performing, in response to detecting the pluggable database recovery event, the pluggable database recovery by at least identifying a backup of log data for recovery, and one or more logs of the backup of log data are selected out from processing and retrieval during the pluggable database recovery based on the set of log activity summary data.

10. A non-transitory computer readable medium having stored thereon a sequence of instructions which, when executed by a processor causes a set of acts comprising:
    maintaining a set of log activity summary data, the set of log activity summary data representing which pluggable databases in one or more consolidated database instances are modified during respective time periods;
    detecting a pluggable database recovery event; and
    performing, in response to detecting the pluggable database recovery event, pluggable database recovery by at least processing the set of log activity summary data to determine during which time periods of the respective time periods one or more corresponding pluggable databases were modified and identifying log data for recovery based at least in part on the determined time periods.

11. The computer readable medium of claim 10, wherein the set of log activity summary data comprises an activity flag, and maintaining the set of log activity summary data comprises:
    receiving a write request to a pluggable database;
    capturing the write request in an in-memory log;
    generating a redo record for the write request in an online activity log; and
    updating the activity flag for the pluggable database, wherein the activity flag indicates that the pluggable database was active during a period of time corresponding to the online activity log.

12. The computer readable medium of claim 11, wherein maintaining the set of log activity summary data further comprises:
    archiving the online activity log, and
    capturing pluggable database activity summary data for the archived online activity log in a consolidated database activity catalog.

13. The computer readable medium of claim 11, wherein the online activity log has a plurality of segments in a shared memory space and respective segments of the plurality of segments are allocated to respective computing devices and have respective pluggable database activity summary data.

14. The computer readable medium of claim 13, wherein the respective pluggable database activity summary data in each respective segment of the plurality of segments are combined into a single vector using a logical or operation.

15. The computer readable medium of claim 10, wherein performing, in response to detecting the pluggable database recovery event, the pluggable database recovery by at least identifying log data for recovery based on the set of log activity summary data comprises at least determining a recovery event type, wherein the recover event type comprises one of a pluggable database restore, a pluggable database hot clone, a pluggable database refresh clone.

16. The computer readable medium of claim 15, wherein the set of acts further comprise selecting out one or more logs based on the set of log activity summary data.

17. The computer readable medium of claim 10, wherein:
multiple sets of log activity summary data summarize write activity over multiple pluggable databases in respective one or more consolidated database instances, and each consolidated database instance of multiple consolidated database instances is associated with a respective set of the sets of log activity summary data,
performing, in response to detecting the pluggable database recovery event, the pluggable database recovery by at least identifying log data for recovery based on two or more of the multiple sets of log activity summary data, and
one or more logs are selected out from processing during the pluggable database recovery based on the set of log activity summary data.

18. The computer readable medium of claim 10, wherein performing, in response to detecting the pluggable database recovery event, the pluggable database recovery by at least identifying a backup of log data for recovery, and one or more logs of the backup of log data are selected out from processing and retrieval during the pluggable database recovery based on the set of log activity summary data.

19. A computing system comprising:
a memory to hold a set of instructions;
a computer processor to execute the set of instructions, which when executed cause a set of acts comprising:
maintaining a set of log activity summary data, the set of log activity summary data representing which pluggable databases in one or more consolidated database instances are modified during respective time periods;
detecting a pluggable database recovery event; and
performing, in response to detecting the pluggable database recovery event, pluggable database recovery by at least processing the set of log activity summary data to determine during which time periods of the respective time periods one or more corresponding pluggable databases were modified and identifying log data for recovery based at least in part on the determined time periods.

20. The computing system of claim 19, wherein the set of log activity summary data comprises an activity flag, and maintaining the set of log activity summary data comprises:
receiving a write request to a pluggable database;
capturing the write request in an in-memory log;
generating a redo record for the write request in an online activity log; and
updating the activity flag for the pluggable database, wherein the activity flag indicates that the pluggable database was active during a period of time corresponding to the online activity log.

21. The computing system of claim 20, wherein maintaining the set of log activity summary data further comprises:
archiving the online activity log, and
capturing pluggable database activity summary data for the archived online activity log in a consolidated database activity catalog.

22. The computing system of claim 20, wherein the online activity log has a plurality of segments in a shared memory space and respective segments of the plurality of segments are allocated to respective computing devices and have respective pluggable database activity summary data.

23. The computing system of claim 22, wherein the respective pluggable database activity summary data in each respective segment of the plurality of segments are combined into a single vector using a logical or operation.

24. The computing system of claim 19, wherein performing, in response to detecting the pluggable database recovery event, the pluggable database recovery by at least identifying log data for recovery based on the set of log activity summary data comprises at least determining a recovery event type, wherein the recover event type comprises one of a pluggable database restore, a pluggable database hot clone, a pluggable database refresh clone, and wherein the set of acts further comprise selecting out one or more logs based on the set of log activity summary data.

25. The computing system of claim 19, wherein:
multiple sets of log activity summary data summarize write activity over multiple pluggable databases in respective one or more consolidated database instances, and each consolidated database instance of multiple consolidated database instances is associated with a respective set of the sets of log activity summary data,
performing, in response to detecting the pluggable database recovery event, the pluggable database recovery by at least identifying log data for recovery based on two or more of the multiple sets of log activity summary data, and
one or more logs are selected out from processing during the pluggable database recovery based on the set of log activity summary data.

26. The computing system of claim 19, wherein performing, in response to detecting the pluggable database recovery event, the pluggable database recovery by at least identifying a backup of log data for recovery, and one or more logs of the backup of log data are selected out from processing and retrieval during the pluggable database recovery based on the set of log activity summary data.

* * * * *

UNITED STATES PATENT AND TRADEMARK OFFICE
CERTIFICATE OF CORRECTION

| | | |
|---|---|---|
| PATENT NO. | : 11,669,411 B2 | |
| APPLICATION NO. | : 17/113091 | |
| DATED | : June 6, 2023 | |
| INVENTOR(S) | : Ravipati et al. | |

It is certified that error appears in the above-identified patent and that said Letters Patent is hereby corrected as shown below:

On the Title Page

On page 2, Column 1, under U.S. Patent Documents, Line 20, delete "Ayudhan" and insert -- Velayudhan --, therefor.

Signed and Sealed this
Second Day of April, 2024

Katherine Kelly Vidal
*Director of the United States Patent and Trademark Office*